(12) United States Patent
Morrison et al.

(10) Patent No.: US 8,964,216 B2
(45) Date of Patent: Feb. 24, 2015

(54) PREDICTING THE TIMES OF FUTURE EVENTS IN A MULTI-THREADED RIP

(75) Inventors: Paul William Morrison, St. Clair (AU); David Robert James Monaghan, Eastwood (AU); Ekaterina Stefanov, Normanhurst (AU)

(73) Assignee: Canon Kabushiki Kaisha, Tokyo (JP)

(*) Notice: Subject to any disclaimer, the term of this patent is extended or adjusted under 35 U.S.C. 154(b) by 579 days.

(21) Appl. No.: 13/312,863

(22) Filed: Dec. 6, 2011

(65) Prior Publication Data

US 2012/0147387 A1 Jun. 14, 2012

(30) Foreign Application Priority Data

Dec. 13, 2010 (AU) ................. 2010249337

(51) Int. Cl.
*G06F 3/12* (2006.01)
*G06K 15/02* (2006.01)
(52) U.S. Cl.
CPC ........ *G06K 15/1857* (2013.01); *G06K 15/1861* (2013.01); *G06F 3/1211* (2013.01); *G06F 3/124* (2013.01); *G06F 3/1285* (2013.01)
USPC .......................... 358/1.15; 358/1.13; 358/1.17
(58) Field of Classification Search
None
See application file for complete search history.

(56) References Cited

U.S. PATENT DOCUMENTS

| | | | |
|---|---|---|---|
| 6,100,998 A * | 8/2000 | Nagao et al. .................... 358/1.9 |
| 6,906,815 B1 * | 6/2005 | Miyake et al. ................. 358/1.15 |
| 7,339,687 B2 * | 3/2008 | Ferlitsch ....................... 358/1.15 |
| 7,742,185 B2 | 6/2010 | Lofthus et al. |
| 2002/0012132 A1 * | 1/2002 | Herceg et al. ................. 358/1.15 |
| 2002/0054333 A1 * | 5/2002 | Yamamoto et al. ........... 358/1.15 |
| 2003/0025938 A1 * | 2/2003 | Iida ............................... 358/1.15 |
| 2003/0193683 A1 * | 10/2003 | Motamed et al. ............. 358/1.13 |
| 2005/0275884 A1 * | 12/2005 | Matsukubo et al. .......... 358/1.15 |
| 2006/0001681 A1 * | 1/2006 | Smith ............................ 345/629 |
| 2006/0055970 A1 * | 3/2006 | Smith et al. ................... 358/1.16 |
| 2006/0263109 A1 * | 11/2006 | Murata ............................ 399/82 |
| 2007/0052998 A1 | 3/2007 | Tsunekawa |
| 2008/0180707 A1 * | 7/2008 | Kanematsu ................... 358/1.15 |
| 2008/0270402 A1 * | 10/2008 | Inoue et al. ................... 358/1.17 |
| 2009/0237734 A1 * | 9/2009 | Owen ............................ 358/1.16 |
| 2009/0244582 A1 * | 10/2009 | Shestak et al. ............... 358/1.13 |
| 2010/0091310 A1 * | 4/2010 | Thomas et al. ............... 358/1.15 |
| 2011/0242555 A1 * | 10/2011 | Nakajima ....................... 358/1.9 |
| 2011/0242575 A1 * | 10/2011 | Owen et al. ................... 358/1.15 |
| 2011/0292412 A1 * | 12/2011 | Klassen et al. ................. 358/1.9 |
| 2011/0310413 A1 * | 12/2011 | Nakao ............................ 358/1.9 |
| 2012/0057191 A1 * | 3/2012 | Gnanasambandam et al. ............................ 358/1.15 |

* cited by examiner

*Primary Examiner* — Nicholas Pachol
(74) *Attorney, Agent, or Firm* — Canon USA, Inc., IP Division

(57) ABSTRACT

Disclosed is a method (2500) of determining, for a rendering job (2402) comprising one or more page building jobs, a start time for a print engine (195) to print the rendering job (2402), the method including determining (2502) for the rendering job a current start time for printing based on at least a predicted finishing time of a page building job, determining (2503) a difference between the predicted finishing time and an actual finishing time of the page building job, determining (2504) if, based on the difference, a predetermined condition is satisfied, and if the predetermined criterion is satisfied, determining (2505) an updated start time for printing the rendering job based on information relating to the actual finishing time of the page building job, and starting (2509) the print engine to print the rendering job at the updated start time.

14 Claims, 28 Drawing Sheets

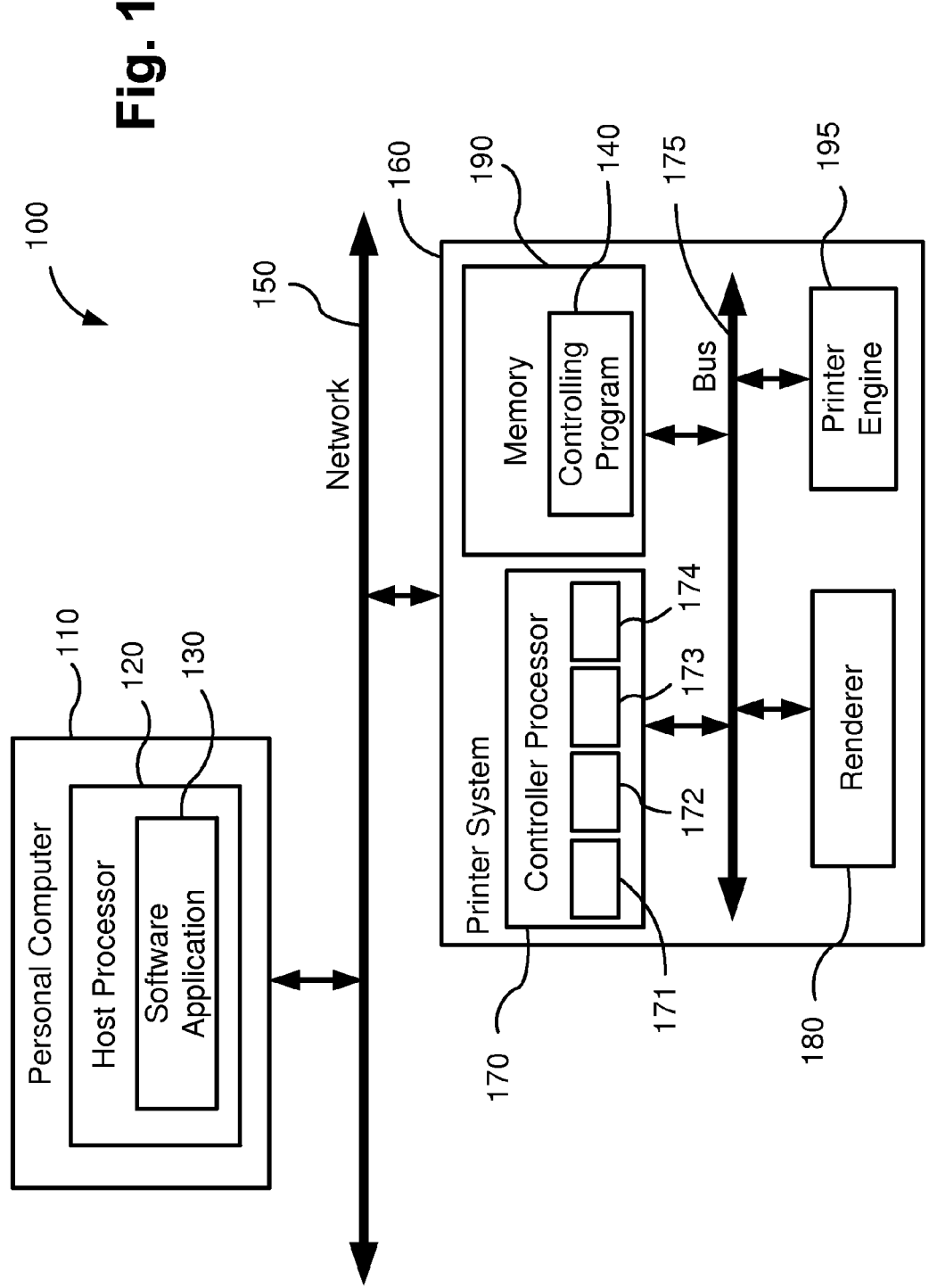

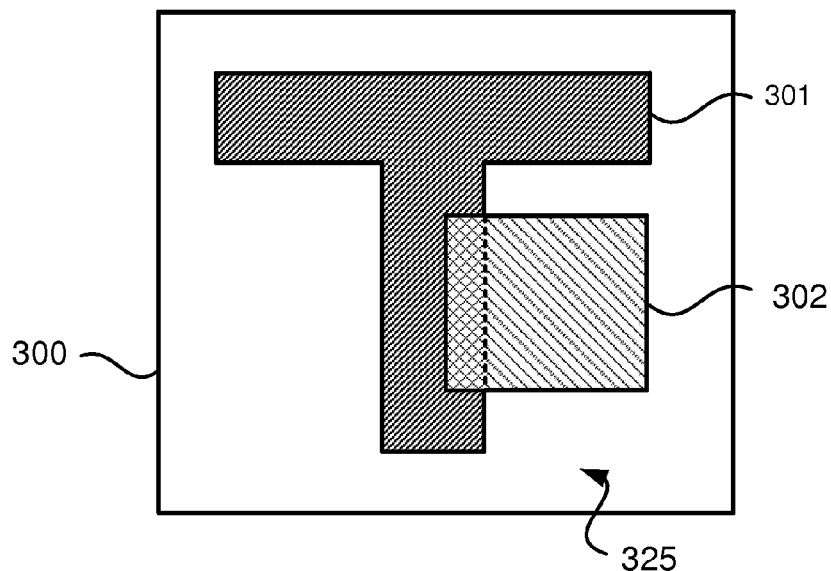
Fig. 3A
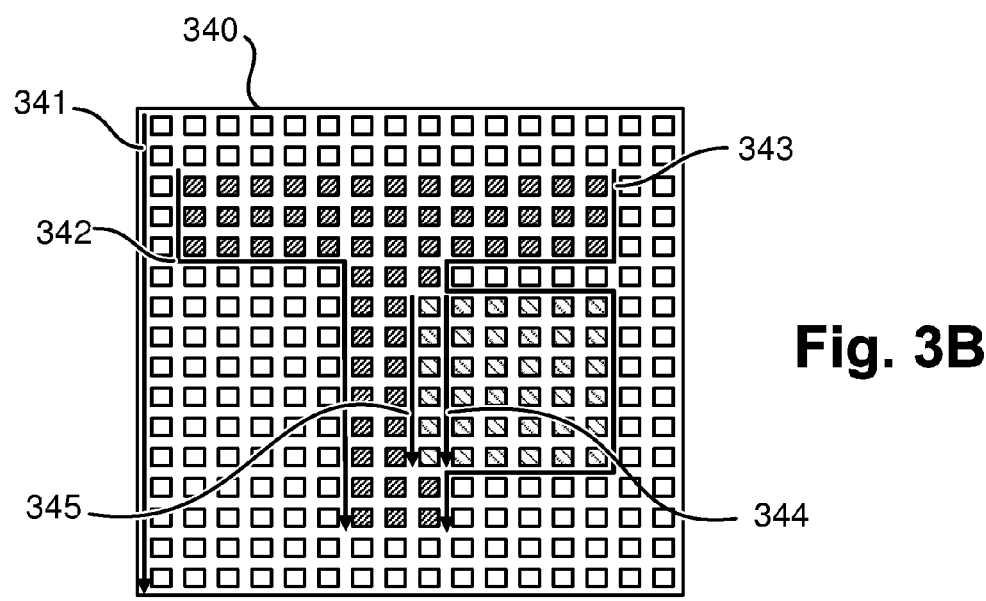
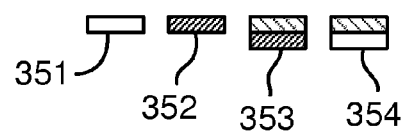
Fig. 3B

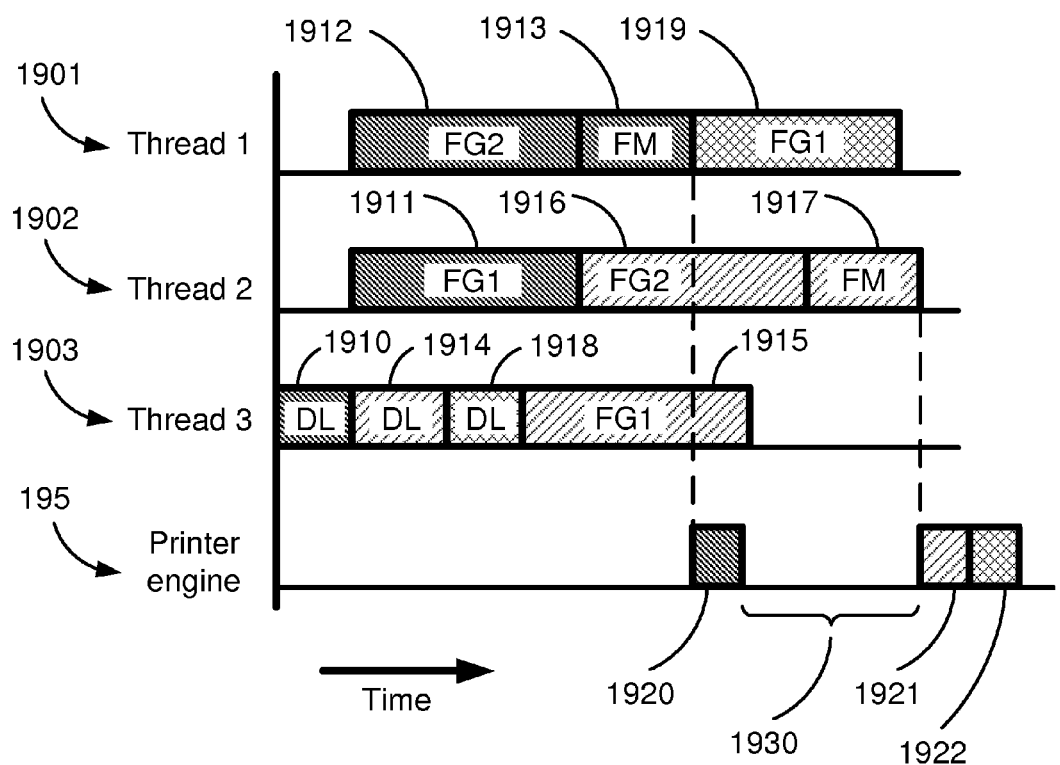
Fig. 19
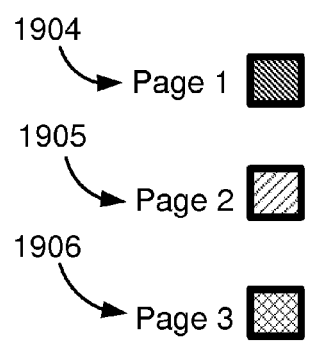

Fig. 23
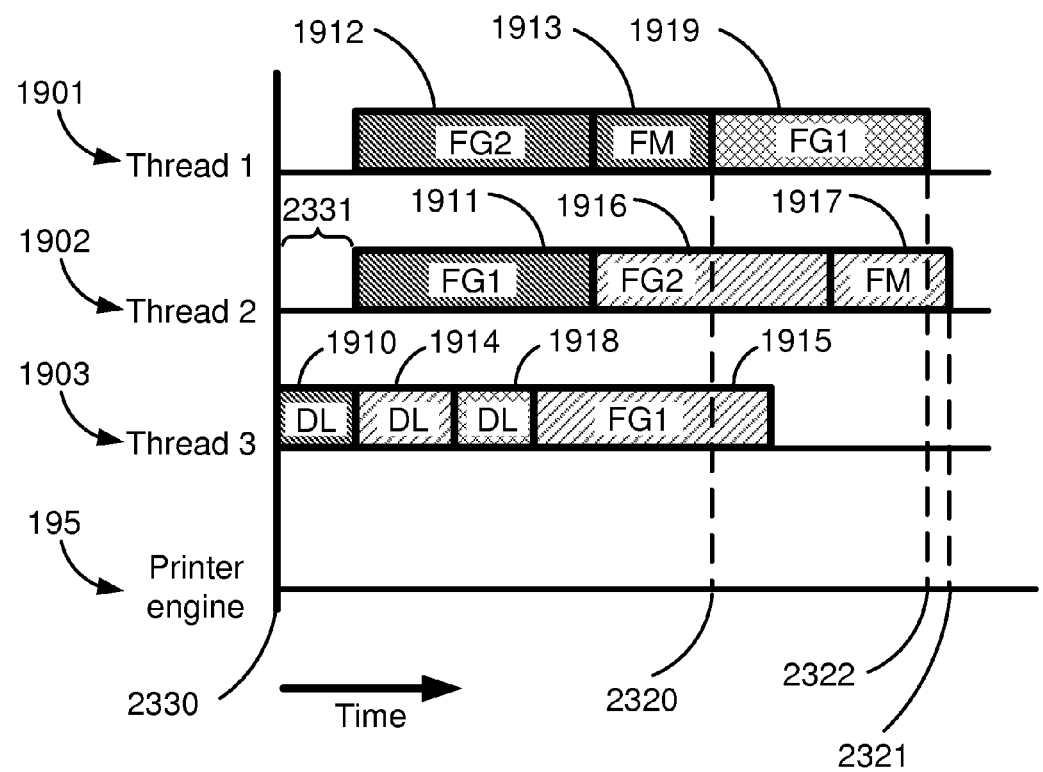
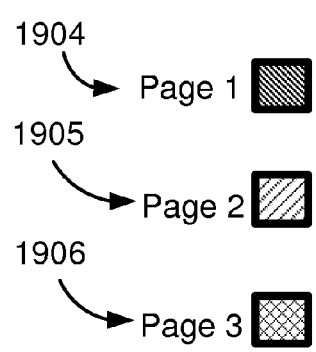

PREDICTING THE TIMES OF FUTURE EVENTS IN A MULTI-THREADED RIP

CROSS-REFERENCE TO RELATED APPLICATIONS

This application claims the benefit under 35 U.S.C. §119 of the filing date of Australian Patent Application No. 2010249337, filed Dec. 13, 2010, hereby incorporated by reference in its entirety as if fully set forth herein.

BACKGROUND OF THE INVENTION

1. Field of the Invention

The present invention relates generally to computer-based printer systems and, in particular, to the prediction of the times of future events in a multi-threaded object-based graphics system, also known as a Raster Image Processor (RIP).

2. Description of the Related Art

Next generation printing systems are expected to operate at a much higher page rate than current printing systems. This is in addition to an increase in device resolution, graphics complexity, and the number of print features supported.

In computing, there is a trend toward achieving higher performance through the use of multi-processor and multi-core architectures. These architectures allow a number of threads to execute in parallel, each on a corresponding processor, thereby reducing the overall time it takes to complete a process. However, in order to take advantage of such parallelism, the processing must typically be broken down into largely independent tasks that can be executed in parallel. This is difficult to achieve for many processes, including many of the operations performed by a RIP.

The RIP process consumes a large proportion of the time required for completing a print job by a printing device. It is therefore desirable that the RIP process be accelerated through the use of multi-threading on a multi-core or multi-processor device. One method of improving printing performance is to perform the RIP process in parallel by (i) subdividing the input graphic objects by z order (which is an ordering of two-dimensional objects that are possibly overlapping), and (ii) rasterizing groups of graphic objects with consecutive z orders (such groups are called z bands) using separate threads executing in parallel. The outputs of all the threads can then be merged to create the final intermediate representation of the page.

In addition to rendering pixels of a page in real-time, it is advantageous to render and print consecutive pages continuously, without breaks between pages. A print engine operates best when it has a continuous stream of pages to print. If a print engine runs out of pages to print, it is said to stall. If a print engine stalls, it may firstly need to spend some time moving to an idle state. When the print engine is subsequently restarted, it may then need to spend additional time moving to a state where it is ready to print. No pages can be printed during this time, and the total print time of all pages is therefore delayed. The total print time is the time by which all pages have completed printing. Stalls can cause other problems for a print engine, including additional power usage, additional wear on print engine components, and paper waste if paper presently in the printing device's paper path needs to be discarded.

A simple method of avoiding stalls in a print engine is to buffer all pages, in either an intermediate format or as a raster images, and start the print engine after the RIP process for all pages is complete. However, this method requires a large buffer which may be costly, and total print time may be high.

It is desirable that stalls in a print engine be avoided, while minimising the total print time. This is very difficult to achieve.

Various techniques in the prior art attempt to solve this problem by altering the order in which pages are processed by a RIP (which may be multi-threaded) and a renderer. For example, if complex pages that take the most time to RIP are processed first, all pages may be ready to be printed closely together in time. The likelihood of stalls is, in this case, reduced. If the duration of the RIP process for pages is estimated prior to the RIP process starting, pages can be ordered such that pages are likely to be ready to be printed by the time the print engine needs them. However, in many cases, such as when all pages are complex, it is difficult to avoid all stalls.

Other techniques in the prior art determine a time to start a print engine such that stalls are avoided and total print time is minimised. Once again, the duration of the RIP process for each page is estimated. The schedule of when and where (in a multi-threaded RIP) each page will be processed is determined based on the estimated duration of the RIP process for each page. This schedule is then used to determine the best time to start the print engine. If page RIP durations can be estimated accurately, stalls will be avoided for the most part and total print time will be minimised.

The main disadvantage of prior art methods is that many factors can cause the actual RIP duration to differ from the estimated RIP duration, including the run-time operation of the CPU and it's cache hierarchy, thread scheduling performed by an underlying operating system, and the inability to accurately estimate the RIP duration based on high-level information. This uncertainty in page RIP duration can undermine the accuracy of calculations made for avoiding print engine stalls. For example, if a page takes longer to RIP than estimated, it may not be ready for the print engine by the time the print engine is ready to receive the page. This will result in a stall in the print engine. Similarly, if a page takes less time to RIP than estimated, the print engine operation will be delayed beyond the point at which it could have commenced, and thus the minimum total print time will not be achieved.

Another disadvantage with much of the prior art is that individual pages cannot be processed in parallel. This will be particularly problematic with complex pages that take substantially longer to RIP than simple pages. The estimation of the RIP duration of complex pages that cannot be processed in parallel will be more uncertain than the estimation of the RIP duration of simple pages. Stalls in a print engine may consequently occur.

SUMMARY OF THE INVENTION

It is an object of the present disclosure to overcome or at least ameliorate one or more of the disadvantages of the prior art.

Disclosed are arrangements, referred to as Re-Prediction Minimization (or RPM) arrangements, which address these issues by (i) predicting the "best" time to start a print engine, and (ii) only when necessary, refining an existing prediction based on the execution of tasks (also referred to as page building jobs) in a multi-threaded RIP.

In accordance with one aspect of the present disclosure there is provided a method of determining, for a rendering job including one or more page building jobs, a start time for a print engine to print the rendering job, the method including determining for the rendering job a current start time for printing based on at least a predicted finishing time of a page building job; determining a difference between the predicted finishing time and an actual finishing time of the page building job; determining if, based on the difference, a predetermined criterion is satisfied; and if the predetermined criterion is satisfied, determining an updated start time for printing the rendering job based on information relating to the actual finishing time of the page building job; and starting the print engine to print the rendering job at the updated start time.

In accordance with another aspect of the present disclosure there is provided a method of determining a start time of an event based on the completion of one or more tasks, the method including determining a current start time of the event, the current start time being based on at least a predicted finishing time of a task; determining, for the task, a difference between the predicted finishing time and an actual finishing time; determining if, based on the difference, a predetermined criterion is satisfied; and if the predetermined criterion is satisfied, determining an updated start time of the event based on information relating to the actual finishing time of the task; and starting the event at the updated start time.

In accordance with another aspect of the present disclosure there is provided an apparatus for determining, for a rendering job including one or more page building jobs, a start time for a print engine to print the rendering job, the apparatus including a processor; and a computer readable storage device containing a program for directing the processor to execute a method including the steps of determining for the rendering job a current start time for printing based on at least a predicted finishing time of a page building job; determining a difference between the predicted finishing time and an actual finishing time of the page building job; determining if, based on the difference, a predetermined criterion is satisfied; and if the predetermined criterion is satisfied, determining an updated start time for printing the rendering job based on information relating to the actual finishing time of the page building job; and starting the print engine to print the rendering job at the updated start time.

In accordance with another aspect of the present disclosure there is provided a computer readable data storage medium containing a program for directing a processor to execute a method of determining, for a rendering job including one or more page building jobs, a start time for a print engine to print the rendering job, the program including code for determining for the rendering job a current start time for printing based on at least a predicted finishing time of a page building job; code for determining a difference between the predicted finishing time and an actual finishing time of the page building job; code for determining if, based on the difference, a predetermined condition is satisfied; and code for, if the predetermined criterion is satisfied, determining an updated start time for printing the rendering job based on information relating to the actual finishing time of the page building job; and code for starting the print engine to print the rendering job at the updated start time.

Other aspects are also disclosed.

BRIEF DESCRIPTION OF THE DRAWINGS

At least one embodiment of the present invention will now be described with reference to the following drawings, in which:

FIG. 1 shows a schematic block diagram of a pixel rendering system for rendering computer graphic object images according to the present disclosure;

FIG. 3A shows a display list representation of a page;

FIG. 3B shows a fillmap representation of the page which is represented in FIG. 3A;

FIG. 19 depicts an example of task execution in a multi-threaded RIP, and the possibility of engine stalls;

FIG. 23 shows an example of the prediction of page RIP times in order to predict the best time to start a print engine;

DESCRIPTION OF THE EMBODIMENTS

The disclosed RPM arrangements aim to ameliorate at least some of the problems of the prior while allowing stalls in a print engine to be avoided and total print time to be minimised.

Figure 24:
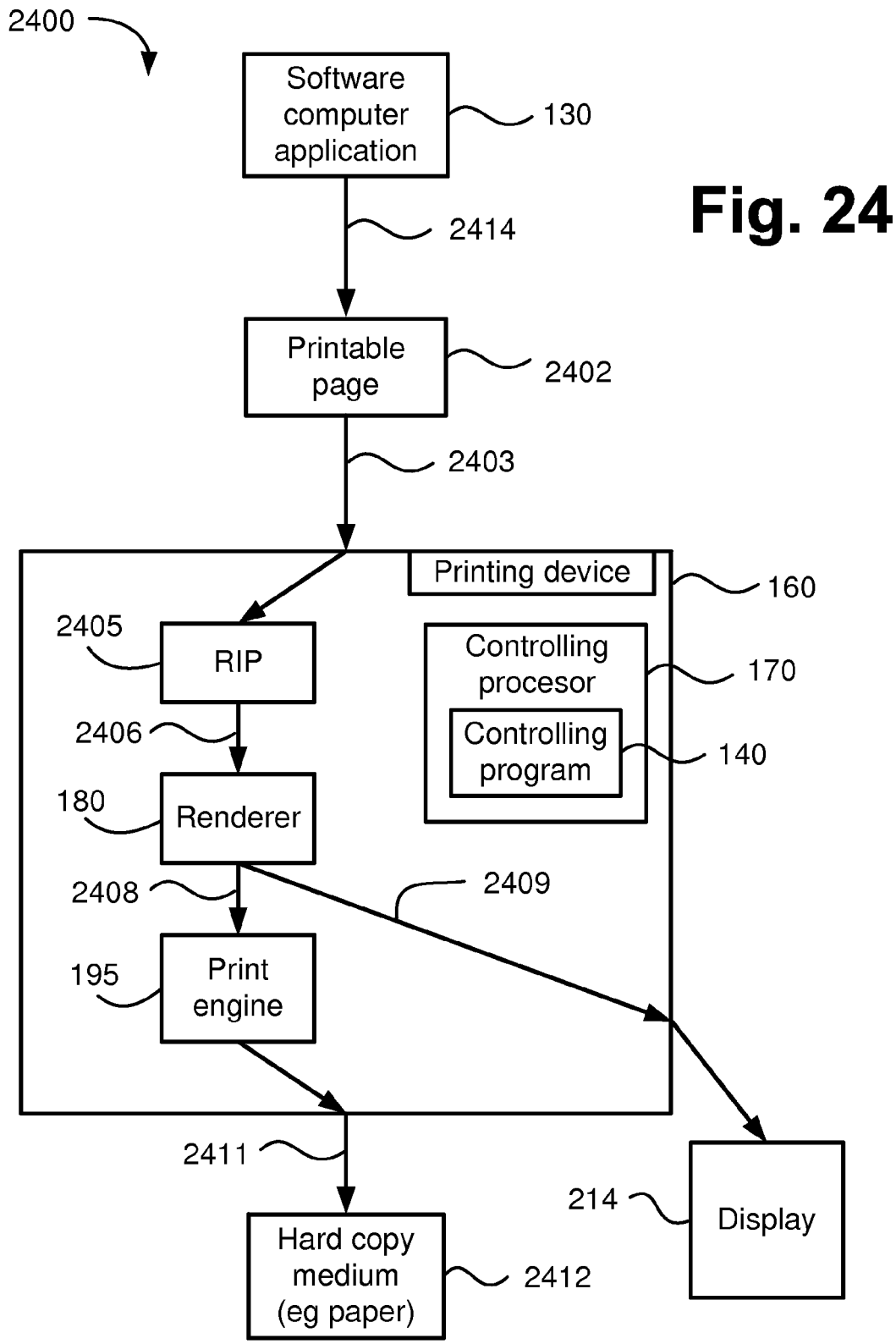
FIG. 24 shows how a software computer application provides a printable page to a printing device for printing to a hard copy medium such as a paper sheet according to an RPM arrangement.

FIG. 24 shows how a software computer application 130 provides a printable page 2402 to a printing device 160 for printing to a hard copy medium 2412, such as a paper sheet. The printable page 2402 is typically provided in the form of a description of the page to be printed, the description being specified using a Page Description Language (PDL), such as Adobe® PDF or Hewlett-Packard® PCL. The PDL provides descriptions of graphic objects to be rendered onto the page in a rendering (or z) order, as opposed to a raster image (i.e. a bitmap of pixel values) of the page to be printed. The printable page 2402 is typically rasterized for printing by an object-based graphics system 2405, also known as a Raster Image Processor (RIP). A renderer 180 may then be used to render the page 2402 to a display 214, or to render the page to be printed 2402 via a print engine 195.

The printing device 160 receives the description of the page to be printed 2402 and generates a rasterized intermediate representation 2406 of the page 2402, using the RIP 2405. In the present description, one example of the intermediate representation 2406 is a fillmap representation of the page to be printed 2402, as described in more detail in regard to FIGS. 3A and 3B. The printing device 160 then renders the intermediate representation 2406 of the page 2402 to a raster image representation 2408 comprising pixels which are printed to the print media 2412, such as paper. In general, the intermediate representation 2406 of the page 2402 consumes less memory than the raster image representation 2408.

In some prior art printing devices, the intermediate representation 2406 of the page 2402 may be rendered to pixels in real-time by the renderer 180, this being the rate at which the output device, be it the printer engine 195 or the display 214, can reproduce output pixels. Real-time rendering is particularly important for video displays, where animation frame rates must be met to ensure fluidity of motion. Real-time rendering in a printing environment is important to ensure compliance with page throughput rates of a printer.

The intermediate page representation 2406 is generated by a controlling program 140 which is executed by a controller processor 170 within the printer device 160. The controller processor 170 may be implemented as a multi-core processor. The intermediate page representation 2406 is transferred to the renderer 180, which renders the intermediate page representation to pixels 2408 and prints the pixels onto the print media 2412 using the printer engine 195 which may, for example, be an electro-photographic engine. The aforementioned description relates to various functional modules such as the RIP 2405. Such modules can be implemented in hardware, software, or a hybrid mix of hardware and software.

FIG. 1 shows a schematic block diagram of a Pixel Rendering System 100 for rendering graphic objects which are processed in accordance with the disclosed RPM arrangement. The Pixel Rendering System 100 comprises a Personal Computer 110 connected to the Printer System 160 through a Network 150. The Network 150 may be a typical network involving multiple personal computers, or may be a simple connection between the Personal Computer 110 and the Printer System 160.

The Personal Computer 110 comprises a Host Processor 120 for executing the Software Application 130, such as a word processor or graphical software application.

The Printer System 160 comprises a multi-core Controller Processor 170, having in this case four processor cores 171, 172, 173 and 174, for executing the Controlling Program 140 which is stored in a Memory 190, the renderer 180, and the Printer Engine 195 coupled via a Bus 175. The renderer 180 is preferably in the form of an ASIC coupled via the bus 175 to the controller processor 170, memory 190, and the printer engine 195. However, the renderer 180 may also be implemented in software that is executed in the controller processor 170. The renderer renders the page representation resulting from the execution of the Controlling Program 140 to pixels. The Controlling Program 140 will later be described with reference to FIG. 5.

The Controlling Program 140 is executed by the Controller Processor 170 in one or more threads. A thread consists of a number of instructions or steps that are executed in sequence by one of the processor cores 171-174. The Controlling Program 140 is preferably multi-threaded, meaning that different threads can be executed at the same time by different processor cores 171-174. The Controlling Program 140 of the present RPM arrangement generates an intermediate representation (such as 2406) of each region of the page to be printed (such as 2402) in a separate thread.

Additional threads may also be executed by the Controller Processor 170. These threads may include an executive thread used to perform scheduling and the prediction of future events, and threads of an operating system that may also be running on the Controller Processor 170. These additional threads may be executed by a processor core 171-174, or by any additional processor cores (not shown) that are not used to execute threads of the present RPM arrangement.

Figure 2A:
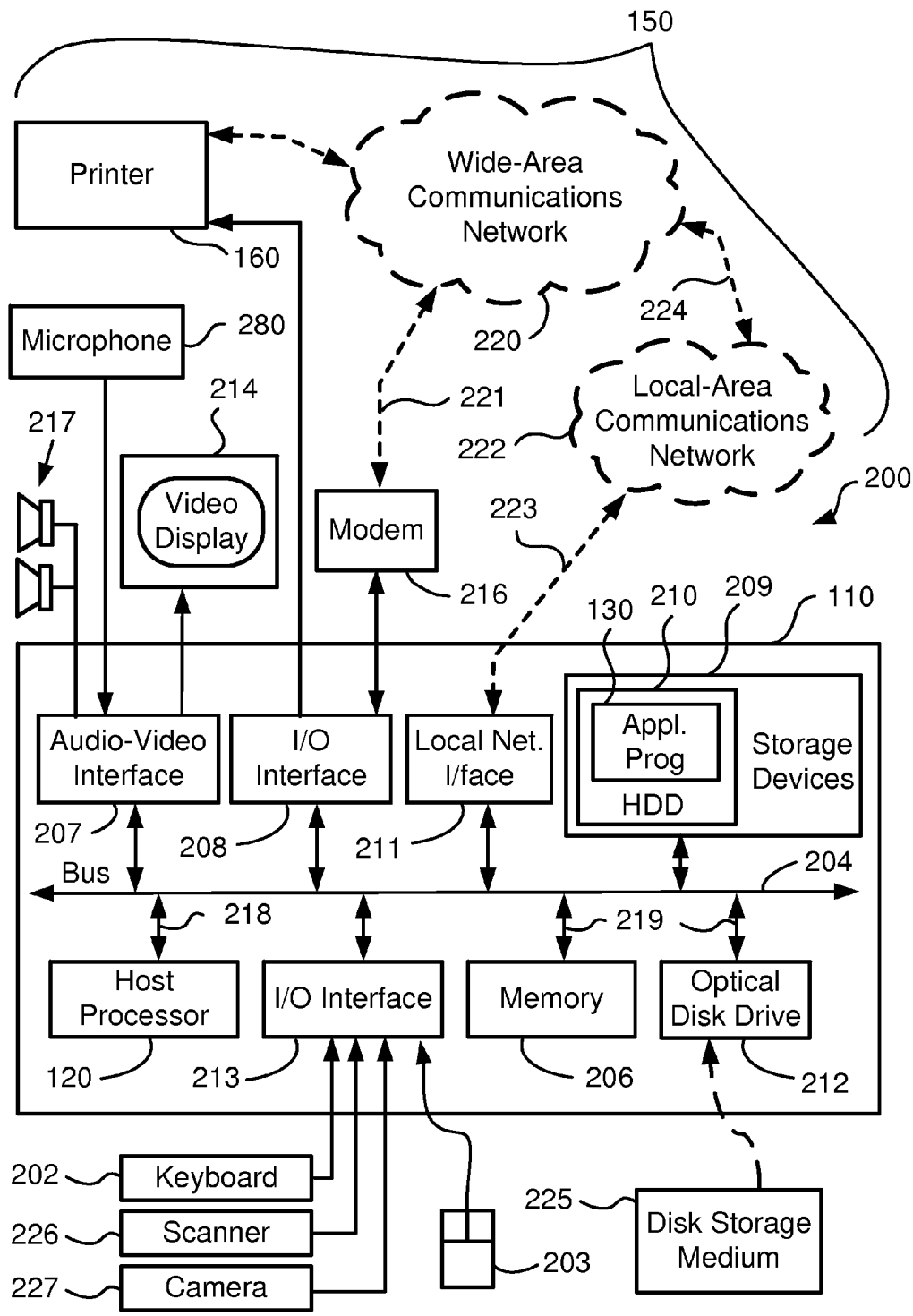
FIGS. 2A and 2B collectively form a schematic block diagram of general purpose computer system in which the arrangement of FIG. 1 may be implemented.
Figure 2B:
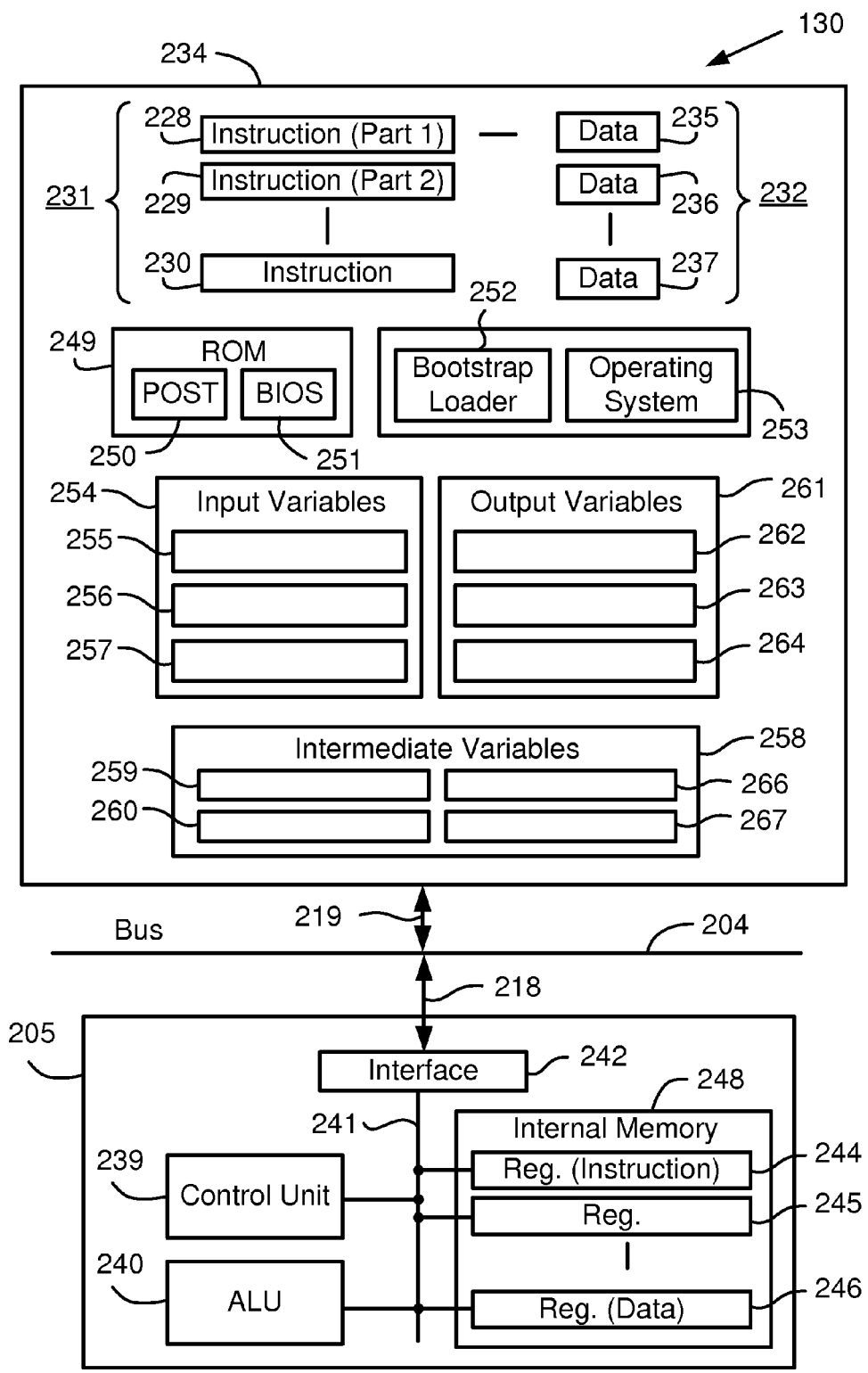

FIGS. 2A and 2B depict a general-purpose Computer System 200, upon which the various arrangements described can be practiced.

As seen in FIG. 2A, the Computer System 200 includes: the Personal Computer Module 110; input devices such as a Keyboard 202, a Mouse Pointer Device 203, a Scanner 226, a Camera 227, and a Microphone 280; and output devices including the Printer 160, the Display device 214 and Loudspeakers 217. An external Modulator-Demodulator (Modem) transceiver device 216 may be used by the Computer Module 110 for communicating to and from a Communications Network 220 via a Connection 221. The Communications Network 220 may be a wide-area network (WAN), such as the Internet, a cellular telecommunications network, or a private WAN. Where the connection 221 is a telephone line, the Modem 216 may be a traditional "dial-up" modem. Alternatively, where the Connection 221 is a high capacity (e.g., cable) connection, the Modem 216 may be a broadband modem. A wireless modem may also be used for wireless connection to the Communications Network 220. The components 220-224 may be considered equivalent to, and an example of, the Network 150 of FIG. 1 to which the Printer 160 couples as seen in FIG. 2A.

The Computer Module 110 typically includes at least one Host Processor 120, and a Memory 206. For example, the Memory 206 may have semiconductor random access memory (RAM) and semiconductor read only memory (ROM). The Computer Module 110 also includes an number of input/output (I/O) interfaces including: an Audio-Video Interface 207 that couples to the Video Display 214, the Loudspeakers 217 and the Microphone 280; an I/O interface 213 that couples to the Keyboard 202, the Mouse 203, the Scanner 226, the Camera 227 and optionally the joystick or other human interface device (not illustrated); and an I/O Interface 208 for the Modem 216 and the Printer 160. In some implementations, the Modem 216 may be incorporated within the Computer Module 110, for example within the I/O Interface 208. The Computer Module 110 also has a Local Network Interface 211, which permits coupling of the Computer System 200 via a Connection 223 to a Local-Area Communications Network 222. As illustrated in FIG. 2A, the Local-Area Communications Network 222 may also couple to the Wide-Area Communications Network 220 via the Connection 224, which would typically include a so-called "firewall" device or device of similar functionality. The Local Network Interface 211 may comprise an Ethernet™ circuit card, a Bluetooth™ wireless arrangement or an IEEE 802.11 wireless arrangement; however, numerous other types of interfaces may be practiced for the Local Network Interface 211.

The I/O interfaces 208 and 213 may afford either or both of serial and parallel connectivity, the former typically being implemented according to the Universal Serial Bus (USB) standards and having corresponding USB connectors (not illustrated). Storage Devices 209 are provided and typically include a hard disk drive, HDD 210. Other storage devices such as a floppy disk drive and a magnetic tape drive (not illustrated) may also be used. An Optical Disk Drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 200.

The components 120 to 213 of the Computer Module 110 typically communicate via a Bus 204 and in a manner that results in a conventional mode of operation of the Computer System 200 known to those in the relevant art. For example, the Host Processor 120 is coupled to the Bus 204 using a connection 218. Likewise, the memory 206 and Optical Disk Drive 212 are coupled to the Bus 204 by Connections 219. Examples of computers on which the described arrangements can be practised include IBM-PC's and compatibles, Sun Sparc stations, Apple Mac™ or like computer systems.

The Software Application program 130 is executable within the Computer System 200. In particular, the steps of the Software Application 130 are effected by Software Instructions 231 (see FIG. 2B) in the Software Application 130 that are carried out within the Computer System 200. The Software Instructions 231 may be formed as one or more code modules, each for performing one or more particular tasks. The software 130 may also be divided into two separate parts, in which a first part and the corresponding code modules performs the application (eg. word processing or graphical imaging) methods and a second part and the corresponding code modules manage a user interface between the first part and the user.

The software Application 130 may be stored in a computer readable medium, including the storage devices described below, for example. The software 130 is loaded into the Computer System 200 from the computer readable medium, and then executed by the Computer System 200. A computer readable medium having such software or computer program recorded on the computer readable medium is a computer program product. The use of the computer program product in the computer system 200 effects apparatus for graphical document generation.

The software Application 130 is typically stored in HDD 210 or the memory 206. The software is loaded into Computer System 200 from a computer readable medium, and executed by the Computer System 200. Thus, for example, the Software Application 130 may be stored on an optically readable disk storage medium (e.g., CD-ROM) 225 that is read by the Optical Disk Drive 212. A computer readable medium having such software or computer program recorded on it is a computer program product. The use of the computer program product in the Computer System 200 preferably effects an apparatus for graphical document generation.

In some instances, the Software Application 130 may be supplied to the user encoded on one or more CD-ROMs 225 and read via the corresponding drive 212, or alternatively may be read by the user from the Wide-Area Communications Network 220 or Local-Area Communications Network 222. Still further, the software 130 can also be loaded into the Computer System 200 from other computer readable media. Computer readable storage media refers to any storage medium that provides recorded instructions and/or data to the Computer System 200 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the Computer Module 110. Examples of computer readable transmission media that may also participate in the provision of software, application programs, instructions and/or data to the Computer Module 110 include radio or infra-red transmission channels as well as a network connection to another computer or networked device, and the Internet or Intranets including e-mail transmissions and information recorded on Websites and the like.

The second part of the Software Application 130 and the corresponding code modules mentioned above may be executed to implement one or more graphical user interfaces (GUIs) to be rendered or otherwise represented upon the Video Display 214. Through manipulation of typically the Keyboard 202 and the Mouse 203, a user of the Computer System 200 and the application 130 may manipulate the interface in a functionally adaptable manner to provide controlling commands and/or input to the applications associated with the GUI(s). Other forms of functionally adaptable user interfaces may also be implemented, such as an audio interface utilizing speech prompts output via the Loudspeakers 217 and user voice commands input via the microphone 280.

FIG. 2B is a detailed schematic block diagram of the Host Processor 120 and a "memory" 234. The memory 234 represents a logical aggregation of all the memory modules (including the HDD 209 and semiconductor memory 206) that can be accessed by the computer module 110 in FIG. 2A.

When Computer Module 110 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the Computer Module 110 to ensure proper functioning and typically checks the Host Processor 120, the Memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the Host Processor 120. This loads an Operating System 253 into the RAM memory 206, upon which the operating system 253 commences operation. The operating system 253 is a system level application, executable by the Host Processor 120, to fulfil various high level functions, including processor management, memory management, device management, storage management, software application interface, and generic user interface.

The Operating System 253 manages the Memory 234 (209, 206) to ensure that each process or application running on the computer module 110 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the Computer System 200 and how such is used.

As shown in FIG. 2B, the Host Processor 120 includes a number of functional modules including a Control Unit 239, an arithmetic logic unit (ALU) 240, and a local or Internal Memory 248, sometimes called a cache memory. The Internal Memory 248 typically includes a number of storage registers 244-246 in a register section. One or more internal busses 241 functionally interconnect these functional modules. The Host Processor 120 typically also has one or more interfaces 242 for communicating with external devices via Bus 204, using a connection 218. The memory 234 is coupled to Bus 204 using a connection 219.

The Software Application 130 includes a sequence of instructions 231 that may include conditional branch and loop instructions. The Software Application 130 may also include data 232 which is used in execution of the Software Application 130. The instructions 231 and the data 232 are stored in memory locations 228, 229, 230 and 235, 236, 237, respectively. Depending upon the relative size of Program Instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the Host Processor 120 is given a set of instructions which are executed therein. The Host Processor 120 waits for a subsequent input, to which the Host Processor 120 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed arrangements may use Input Variables 254, which are stored in Memory 234 in corresponding memory locations 255, 256, 257. The arrangements may produce Output Variables 261, which are stored in the memory 234 in corresponding memory locations 262, 263, 264. Intermediate Variables 258 may be stored in memory locations 259, 260, 266 and 267.

Referring to the Host Processor 120 of FIG. 2B, the registers 244, 245, 246, the arithmetic logic unit, ALU 240, and the Control Unit 239 work together to perform sequences of micro-operations needed to perform "fetch, decode, and execute" cycles for every instruction in the instruction set making up the Software Application 130. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the Control Unit 239 stores or writes a value to Memory Location 232.

Each step or sub-process in the processes described is typically associated with one or more segments of the Software Application 130 and is performed by the register section 244, 245, 247, the ALU 240, and the control unit 239 in the processor 120 working together to perform the fetch, decode, and execute cycles for every instruction in the instruction set for the noted segments of the Software Application 130.

Operation of the Printer System 160 is similar to that of the personal computer in terms of storage and execution of the Controlling Program 140 by the Memory 190 and the Controller Processor 170 respectively, noting however that the controlling program is multi-threaded with distinct program threads executing on corresponding ones of the multiple processing cores making up the controller processor 170.

Returning to FIG. 1, in the Pixel Rendering System 100, the Software Application 130 creates page-based documents for printing such as 2402, where each page contains objects such as text, lines, fill regions, and image data. The Software Application 130 sends a high-level description of the page (for example a PDL file) to the Controlling Program 140 that is executed in the Controller Processor 170 of the Printer System 160 via the Network 150. A page such as 2402 is also known to the RIP 2405 and controlling program 140 as a "rendering job". A rendering job contains all information required by the Pixel Rendering System 100 to RIP, render, and print the page.

The Controlling Program 140 receives a description of the page to be printed 2402 from the Software Application 130, and performs the RIP process 2405 to generate the intermediate representation 2406 of the page 2402. As described later with reference to FIG. 5, the Controlling Program 140 may divide the rendering job into a number of "tasks" or "page building jobs". Each task or page building job completes a portion of the RIP process for a given rendering job, and is executed by a processor core such as 171, 172, 173 and 174. The Controlling Program 140, as executed by the Controller Processor 170, is also responsible for instructing the renderer 180 to render the intermediate representation 2406 of the page 2402 to pixels 2408, and for instructing the Printer Engine 195 to and to print the pixels 2408 onto print media such as paper 2412.

The Controlling Program 140 will later be described with reference to FIG. 5.

FIGS. 3A and 3B show an example of the intermediate representation 2406 of a page such as 2402. A fillmap is a region-based intermediate page representation. A fillmap is more compact than a raster page representation and can be converted quickly and easily to the raster (pixel) representation required for printing by the Printer Engine 195. A fillmap consists of fillmap regions. Fillmap regions do not overlap and hence each pixel in the rendered page can only belong to a single fillmap region. Each fillmap region within the fillmap is defined by a set of pixel-aligned fillmap edges corresponding to a set of vector edges in the PDL description. A fillmap maps a fillmap region of pixels within the page to a fill sequence which will be composited to generate the colour data for each pixel within that fillmap region.

FIG. 3A shows a page 300 with two objects, 301 and 302 on a background 325. These two objects and their relative positions define regions with different characteristics such as page position and fill. Examples of fills include flat colour, patterns, blends representing a linearly varying colour, bitmap images and tiled (i.e. repeated) images; all of these examples can have varying transparency associated with them.

FIG. 3B shows an example fillmap representation 340 of the page 300 represented in FIG. 3A. The fillmap representation is composed of five pixel-aligned fillmap edges 341-345. Each pixel-aligned fillmap edge references a fill sequence 350 which is used to determine the colour of each of the pixels activated by that pixel-aligned fillmap edge.

Accompanying the fillmap representation 340 of the page is a table 350 of fill sequences which contains the fill sequences 351, 352, 353 and 354 which are referenced by the pixel-aligned fillmap edges such as 341 that are contained in the fillmap representation 340 of the page.

Parallel Processing of Tasks|Multithreaded ARR

The RIP process 2405, used to generate a fillmap representation 2406 for a single page such as 2402, can be divided into a number of task instances called tasks. Each task involves the processing of input PDL page data associated with a single page or a portion of a page such as 2402. The output of the RIP process 2405 is a fillmap representation 2406 of that page 2402. Some tasks required for processing a given page might depend on completion of another task. Other tasks are independent of one another as they operate on different and independent page data. Tasks that process tasks independent of one another can be performed in parallel and such opportunities for parallelism are exploited in a multi-threaded RIP system.

Tasks and Task Dependencies

There are four types of tasks required to be carried out by the Controlling Program 140 to generate the fillmap representation 2406 of the page 2402. These task types will now be described.

A "display list task" processes PDL objects in the page 2402 and generates a z ordered list of the page graphic objects for either a single page or a portion of a single page. The construction of this z ordered list will be described in more detail below.

An "image compression task" compresses a PDL bitmap image in the page 2402, in order to conserve memory resources until that bitmap image is required to be printed by the print engine 195, at which time it is decompressed.

A "fillmap generation task" creates fillmaps as described above with reference to FIGS. 3A and 3B, dependent on the z ordered lists that are output from the display list task.

A "fillmap merge task" merges two or more fillmaps, which are output from the fillmap generation task which represent portions of a page, into a single fillmap that represents the whole page.

Z-Band Fillmaps

Figure 4:
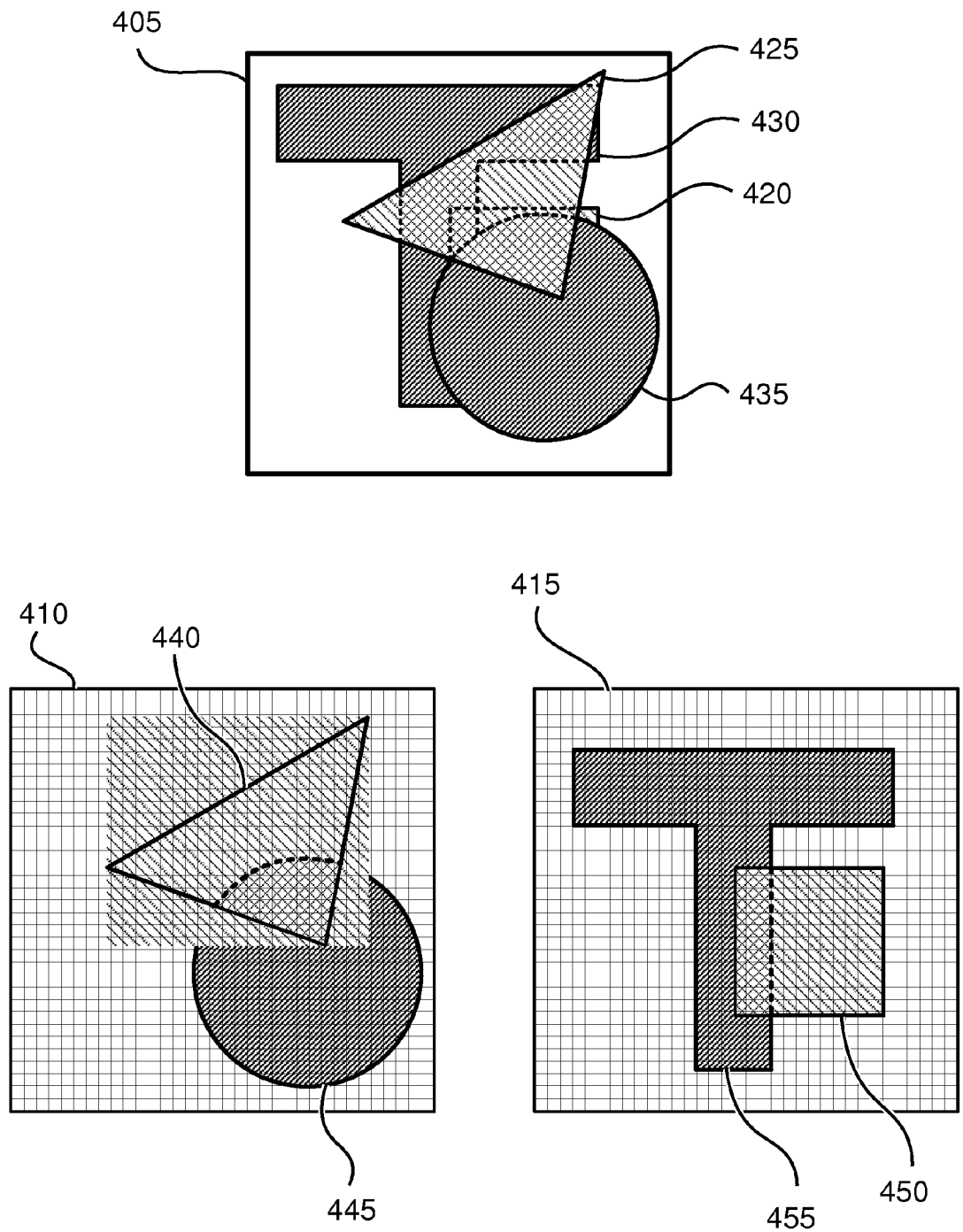
FIG. 4 shows the division of a display list representation of a page into two z bands, and the fillmap representations of those z bands.

Some monolithic and large tasks, such as the fillmap generation task for a complex page, can be split into a number of independent fillmap generation tasks each representing a portion of the page. This approach provides further opportunities for parallelism. A convenient way of allocating page objects to different fillmaps is by their z order appearance on a page. Groups of objects with consecutive z orders are called z bands and are processed as one fillmap. The size of a z band can be pre-set to some number of page objects, or determined during execution according to some criteria such as the cumulative complexity of objects in the fillmap being built. The determination of complexity of objects is described later. Referring now to FIG. 4, z bands will now be described.

FIG. 4 shows a page 405 with four graphic objects, 420, 425, 430 and 435. A Fillmap 410 contains representations for the two graphic objects 440 and 445, and a fillmap 415 contains representations of the remaining two graphic objects, 450 and 455. The two fillmaps 410 and 415 can be processed independently, possibly in parallel, and later merged into one final fillmap representing all graphic objects on the page. In general, the number of fillmaps for a page varies depending on the complexity of the page being rendered.

Multi-Threaded Operation

The Controlling Program 140 will now be described in detail. The Controller Program 140 is multi-threaded and consists of portions of which are capable of being executed in parallel on the Controller Processor cores (171-174).

Figure 5:
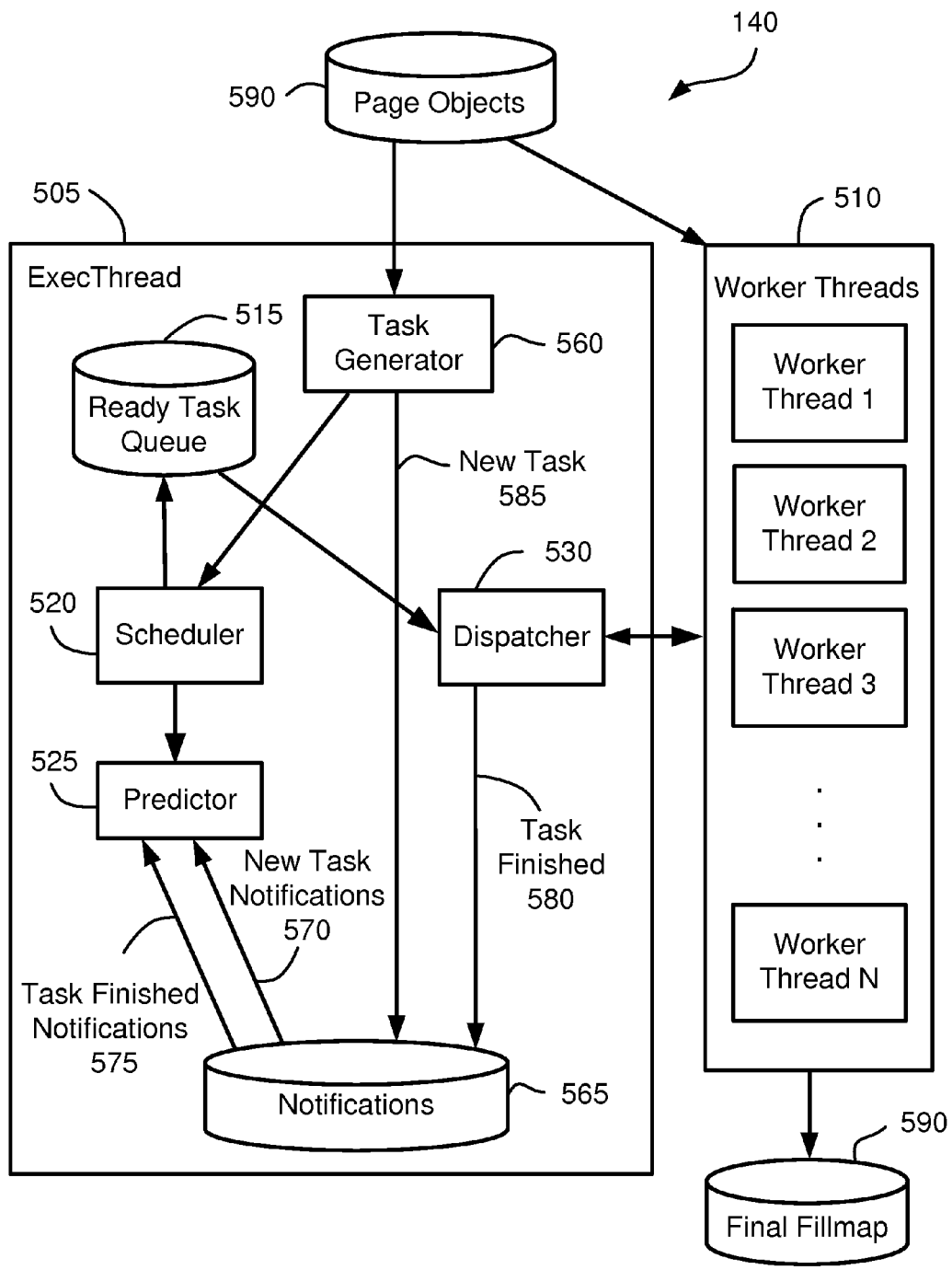
FIG. 5 shows the components of a multi-threaded RIP for producing an intermediate representation of a page according to the present disclosure.

FIG. 5 shows how the Controller Program 140 consists of an ExecThread 505 and Worker Threads 510. The ExecThread 505 initiates and oversees the execution of the RIP process. The Worker Threads component 510 runs tasks on worker threads as directed by the ExecThread 505. Any given page requires the execution of one or more tasks in order to be prepared for printing. The following description relates to various functional modules such as the task generator 560. Such modules can be implemented in hardware, software, or a hybrid mix of hardware and software.

The ExecThread 505 will now be described in detail. The ExecThread 505 consists of the following components. A Task Generator 560, a Dispatcher 530, a Scheduler 520, a Predictor 525, a Notifications Store 565 and a Ready Task Queue 515. The Task Generator 560 receives PDL data from a Page Objects store 590, calculates the complexity of the objects, and creates all the tasks required to prepare the page for printing by the Printer Engine 195. The Task Generator 560 stores details of the tasks in the Notifications Store 565.

The Scheduler 520 receives details of the tasks from the Task Generator 560. The Scheduler 520 places tasks on the Ready Task Queue 515 in an order determined by a scheduling algorithm. The scheduling algorithm assigns a priority to each task according to a set of pre-determined rules, and tasks on the Ready Task Queue 515 are kept in descending task priority order i.e. high priority tasks are at the front of the queue and low priority tasks at the end of the queue.

The Dispatcher 530 is responsible for assigning tasks from the Ready Task Queue 515 to Worker Threads 510 as the worker threads become available. The Dispatcher 530 receives signals from the Worker Threads 510 when a thread is idle, in which case the Dispatcher 530 (1) polls the Ready Task Queue 515 for the next highest priority task suitable to run on the thread that has just become available and, (2) stores a Task Finished 580 notification in the Notifications store 565. The Worker threads 510 receive necessary data required for completing a task from the Page Objects store 590.

The Predictor 525 has two functions. The first function of the Predictor 525 is to estimate the time an individual task is likely to take. The second function of the Predictor 525 is to analyse all pending tasks and, utilising the same rules as those used by the Scheduler 520, to predict the time when significant future events such as the print engine start time should occur. The Predictor 525 performs an initial estimate of the task durations and determines an initial start time of the printer engine, and performs subsequent re-evaluations (ie refinements), such as for updated (i.e. refined) start times of the printer engine, should such re-evaluation be deemed necessary. The initial estimate of task duration by the predictor 525 is based on the complexity associated with the portion of the page to be processed by the task. Subsequent re-evaluations of task durations are guided by information passed via the Notifications store 565 to the Predictor 525. The workings of the Predictor are described later in detail with reference to FIG. 6. From a terminology perspective, an estimated start time is, at the time it is estimated, referred to as the current start time. Clearly the current start time may also be the initial start time, or an updated start time.

The duration of a task can be derived from its complexity measure. The complexity of a task can be measured in a number of ways such as using a Big O notation. One example of a complexity measure for this RPM arrangement is a complexity metric determined as a function of one or more parameters characterising the PDL data being processed. These parameters vary from one task type to another. For instance the complexity of a display list task can depend on the number of objects on a page and the object type. The complexity of an image compression task depends on the size of the bitmap image being processed. The complexity of a fillmap generation task depends on the number of graphic objects represented in that fillmap and their position and size on the page relative to one another. For example, overlapping transparent graphic objects require more processing time than non-overlapping opaque graphic objects. The complexity of a fillmap merge task depends on the number of fillmaps to be merged and the complexity of these fillmaps. The relationship between the complexity metric and the parameters that influence a task's complexity is preferably previously derived for each task type using a suitable offline procedure such as machine learning or other known non-linear regression techniques known in the art. For example, machine learning may be used to train a function to estimate the complexity of fillmap generation tasks based on the number of objects in a z-band, and the overlap between those object.

In one example of the current RPM arrangement, the accuracy of the duration of a task is improved with the knowledge of previous tasks that have finished execution. For example, if the multi-threaded RIP is heavily loaded and tasks are taking longer to execute than estimated, this information is used to increase the estimated durations of new tasks. Such a feedback mechanism can be implemented by recording a history of the errors in estimation of the duration of previous tasks, and adding the average value of the previous errors to the estimated duration of a given new task. Note that a negative average error will result in shortening the estimated duration of a new task, for example. This feedback mechanism leads to more accurate predictions of the times of future events.

Figure 6:
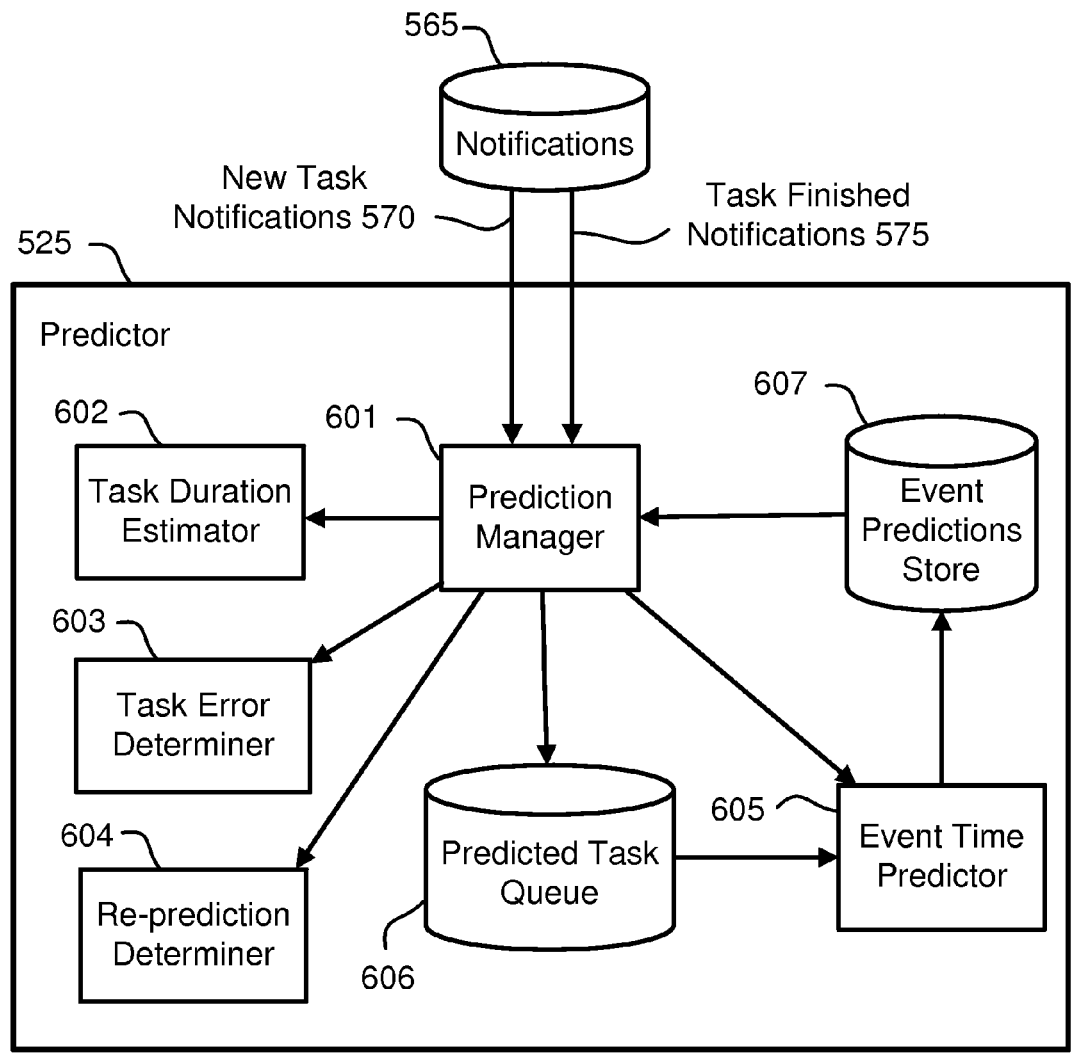
FIG. 6 shows the components of the predictor of FIG. 5 in a multi-threaded RIP.

FIG. 6 depicts the operation of the Predictor 525. The Predictor 525 includes a Prediction Manager 601, a Task Duration Estimator 602, a Task Error Determiner 603, a Re-prediction Determiner 604, an Event Time Predictor 605, a Predicted Task Queue 606, and an Event Predictions Store 607.

The Prediction Manager 601 reads New Task Notifications 570 and Task Finished Notifications 575 from the Notifications store 565. The Prediction Manager 601 subsequently communicates with other components within the Predictor 525 in response to these notifications. The operation of the Predictor 525 in response to New Task Notifications 570 and Task Finished Notifications 575 from Notifications 565 in accordance with the described RPM arrangement will be described with reference to FIG. 7 and FIG. 8, respectively.

New Task Notifications 570 are notifications that new tasks have been created, along with details of these tasks. The type of a new task can be one of any of the task types described previously, namely display list task type, image compression task type, fillmap generation task type and fillmap merge task type. New Task Notifications 570 comprise the task ID of the task, the page number to which the task applies, the type of the task, the complexity of the Task as determined by the Task Generator component 560, and identification of any pre-existing tasks upon which the new Task is dependent. For example, a new fillmap merge task may be dependent on two or more new fillmap generation tasks.

The New Task Notifications 570 also includes a flag indicating whether a new task is the last task in a group of tasks. New task notifications 585 for all tasks in a group of tasks are stored in the Notifications store 565 at the same time. All tasks in the group can belong to the same page to be printed, or can be generated by the Task Generator at the same time under other circumstances. The last task in a group of tasks is the task corresponding to the New Task notification that is stored in the Notifications store 565 at the latest time in the group. If the task is not part of a larger group of tasks, this flag is set.

In summary, a new task notification includes all information required by the Predictor 525 to estimate when and on which thread the Task will be executed in accordance with the scheduling algorithm.

Task Finished Notifications 575 are notifications that a task has finished execution. A task finished notification contains the task ID of the task that has finished execution, and the actual duration of the task. The actual duration of a task is the difference in system time from the start of execution of a Task by the processor running the Task to the completion the Task. The Predictor 525 uses these task finished notifications (i) to determine whether a re-prediction of the times of future events is required and, if it is required, (ii) to calculate new predictions of the event times. This process is described in more detail with reference to FIG. 7. Instead of the task finished notifications, other information about finished page building jobs can be used to determine whether a re-prediction of the times of future events is required. For example, a re-prediction of the times of future events may only be required for tasks of a certain type (e.g. fillmap generation tasks).

The Task Duration Estimator 602 estimates the duration of a new task based on the complexity of the task, stored in the new task notification. The estimation of the duration of a task is described in more detail later, with reference to FIG. 18.

The Task Error Determiner 603 determines the error in task duration estimation for a given task that has finished execution. This error is calculated as the difference between the estimated task duration as determined by the Task Duration Estimator 602 and the actual duration of the task as stored in the corresponding task finished notification.

The Re-prediction Determiner 604 determines whether a re-prediction needs to take place, in response to a new task notification or a task finished notification. The processing performed by the Re-prediction Determiner 604 is described in more detail with reference FIGS. 9 and 10.

The Predicted Task Queue 606 is used to store predicted tasks. Every task that has not been executed yet has a corresponding predicted task stored in the Predicted Task Queue 606. A predicted task is used by the Predictor 525 to predict when its corresponding task will be executed and to determine the times of future events in the multi-threaded RIP.

The Event Time Predictor 605 predicts the times of future events based on the information about predicted tasks stored in the Predicted Task Queue 606. The Event Time Predictor 605 schedules the predicted tasks using the scheduling algorithm used by the Scheduler 520, and uses the subsequent arrangement of predicted tasks to determine the times of the future events. This process is described in more detail with reference to FIGS. 14-17.

The Event Predictions Store 607 stores the times of future events determined by the Event Time Predictor 605. The contents of the Event Predictions Store 607 are made available to other components within ExecThread 505, to be used for setting the engine start time and for other purposes.

Figure 7:
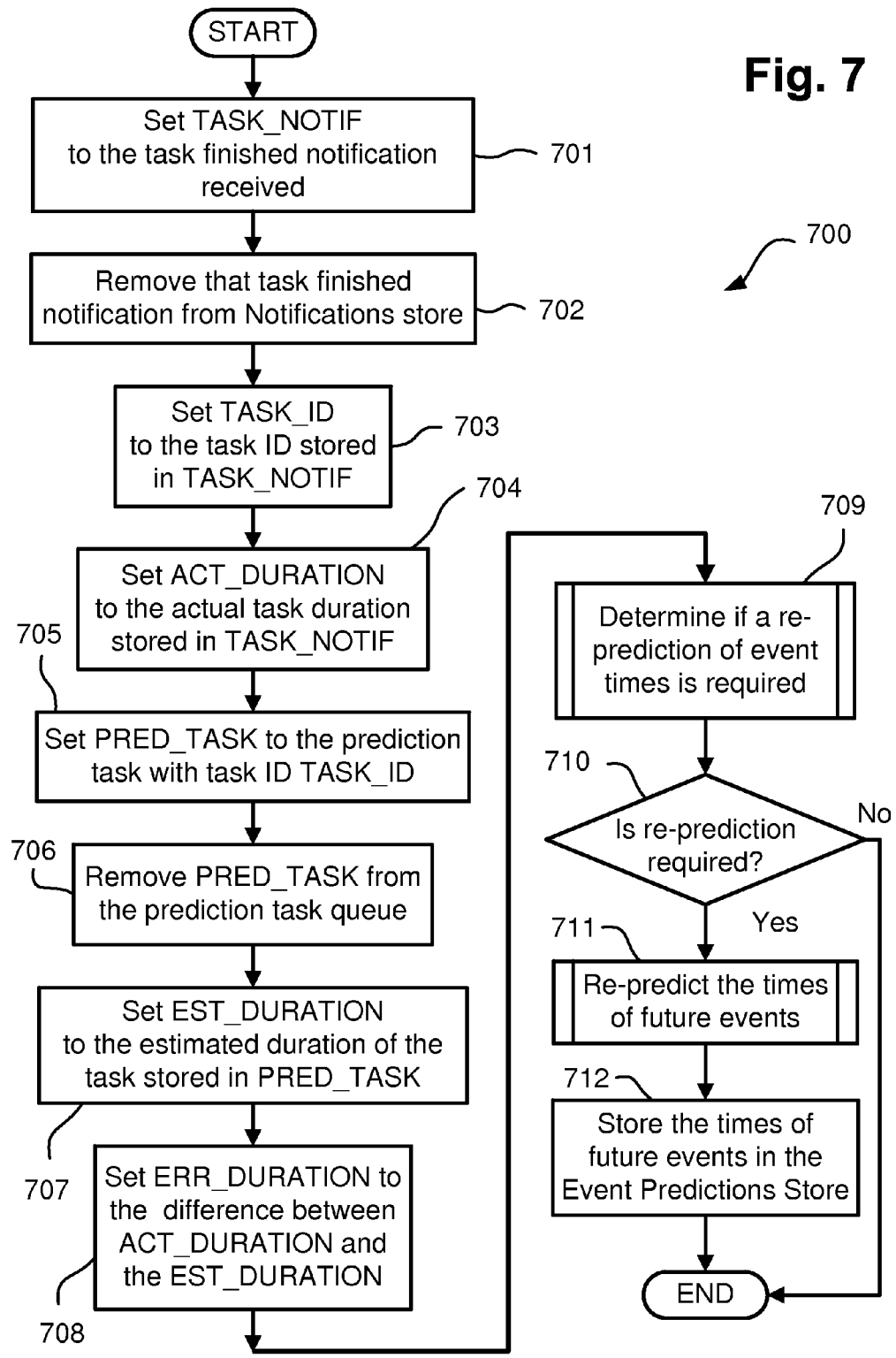
FIG. 7 shows the operation of the predictor in a multi-threaded RIP in response to a task finishing execution.

FIG. 7 shows an example of a method 700 used by the Predictor 525 in response to a task finishing execution. In the method 700, the calculation of an error in the estimated duration of a task finishing execution is carried out. This error is used to determine if a re-prediction of the times of future events needs to occur. The estimation of task durations will later be described with reference to FIG. 18. An error in task duration estimation can be caused by many factors. In most multi-threaded RIP systems, there will be an underlying operating system controlling low level allocation of threads to processors, and the scheduling of other processes that may be running in the same system. The operating system behaviour is typically unpredictable, and identical tasks may take more or less time to execute in different situations. There are also lower level effects, such as the operation of a CPU cache, which may also cause the actual duration of a task to deviate from its estimated duration. In addition, the Task Duration Estimator 602 performs calculations based on high-level or incomplete information. The task duration calculation itself will therefore introduce a degree of error. Indeed, error and uncertainty in task duration estimations appear in many applications of scheduling and prediction, and are not specific problems to a multi-threaded RIP.

The current RPM arrangement recognises that this error exists, and that it affects the prediction of the times of future events.

The value of an error in the estimated task duration indicates both the magnitude of the error, and whether the task executed in less time than estimated (a negative error), or more time than estimated (a positive error), as given by its "sign". If that value is zero, the task has taken the same amount of time to execute that was estimated. Both the magnitude and the sign of the error of task duration estimation are used in the current RPM arrangement to determine if a re-prediction of the times of future events is necessary.

The method 700 starts and proceeds to a setting step 701 where the next task finished notification of the Task Finished Notifications 575 received by the Predictor 525 is set by the Prediction Manager 601 to the variable TASK_NOTIF. TASK_NOTIF is a data structure suitable for storage in memory of the details associated with a task finished notification as described earlier. Processing then proceeds to a step 702 where the task finished notification stored in variable TASK_NOTIF is removed from the Notifications store 565.

Processing then proceeds to a step 703 where the variable TASK_ID is set by the Prediction Manager 601 to the task ID stored in TASK_NOTIF. Processing then proceeds to a step 704 where the actual duration of the task stored in the task notification stored in variable TASK_NOTIF is set by the Prediction Manager 601 to the variable ACT_DURATION.

Processing then proceeds to a setting step 705 where the predicted task with a task ID equal to the task ID stored in variable TASK_ID is located in the Predicted Task Queue 606, and stored in the variable PRED_TASK by the Prediction Manager 601.

Processing then proceeds to a step 706 where the predicted task stored in the variable PRED_TASK is removed from the Predicted Task Queue 606 by the Prediction Manager 601. As the task corresponding to PRED_TASK has finished execution, the variable PRED_TASK is no longer needed for calculating future predictions.

Processing then proceeds to a setting step 707 where the Prediction Manager 601 sets the variable EST_DURATION to the estimated duration of the predicted task PRED_TASK. Processing then proceeds to a setting step 708 where Task Error Determiner 603 determines the difference between the actual duration stored in the variable ACT_DURATION and the estimated duration stored in the variable EST_DURATION, and stores the result in a variable ERR_DURATION. The value of ERR_DURATION represents the error in estimation of the duration of task PRED_TASK.

Processing then proceeds to a determining step 709 where it is determined by the Re-prediction Determiner 604 whether a re-prediction of future event times needs to be performed. The Determining step 709 is based on the error value stored in the variable ERR_DURATION, among other information. The process of determining if a re-prediction of future event times is required in response to a task finished notification will be described later with reference to FIG. 9.

Prior to completion of the step 709, the Re-prediction Determiner 604 sets a Boolean variable REPREDICT to True or False, depending on its determination of whether a re-prediction needs to be performed or does not need to be performed, respectively.

Processing then proceeds to a step 710, where the value of the Boolean variable REPREDICT set by process 709 is checked by the Prediction Manager 601. If it is determined that re-prediction is required (i.e. the variable REPREDICT is True), processing proceeds to a step 711, where the re-prediction of future event times is performed by the Event Time Predictor 605. The process of re-predicting the times of future events will be described later with reference to FIG. 14. Processing then proceeds to a step 712, where the predicted times of future events are stored in the Event Predictions Store 607 component of the Predictor 525 by the Event Time Predictor 605. Processing terminates upon the completion of step 712.

If at the selection step 710 it was determined that re-prediction was not required (i.e. the variable REPREDICT is False), then process 700 terminates.

Figure 8:
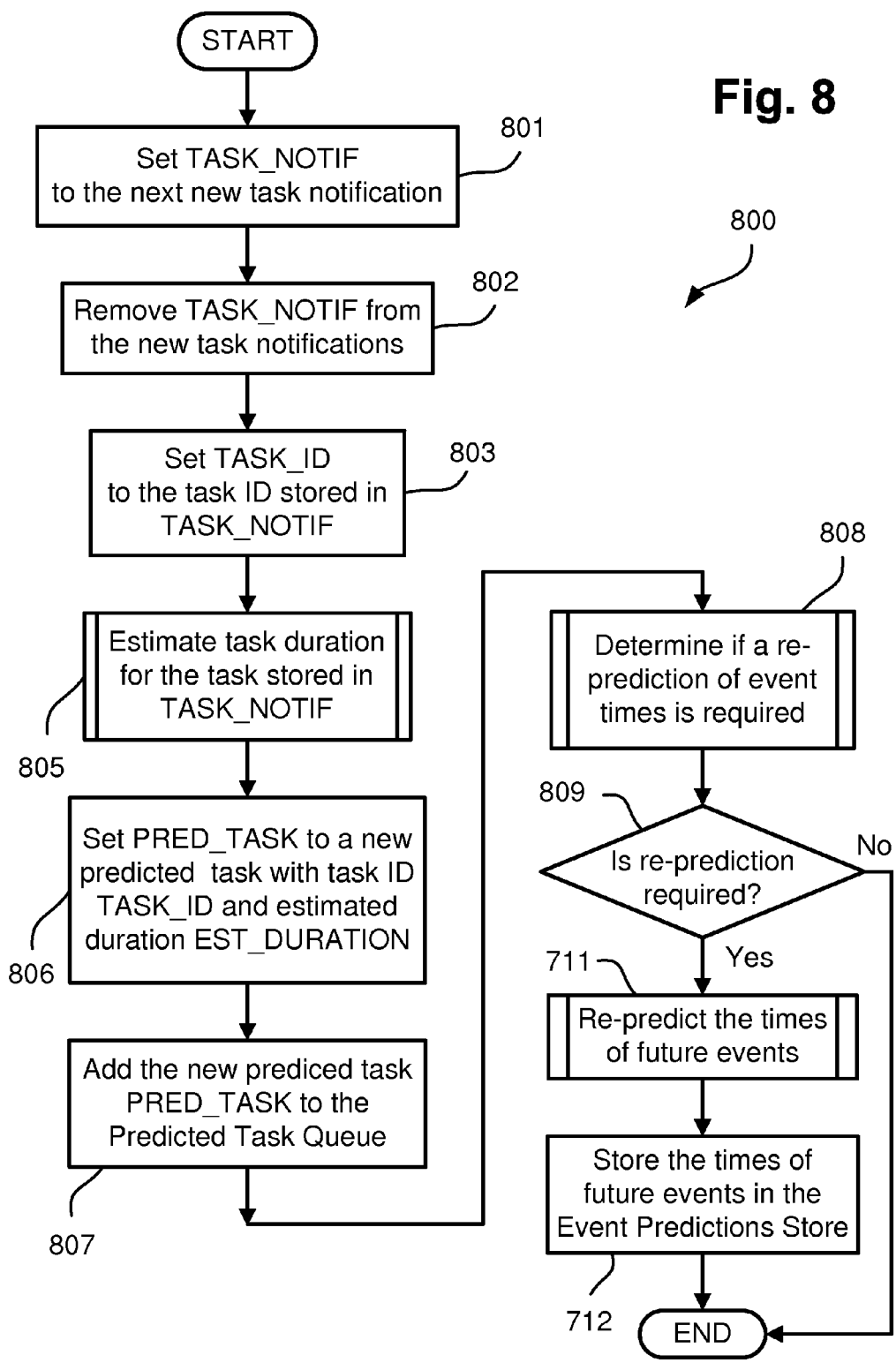
FIG. 8 shows the operation of the predictor in a multi-threaded RIP in response to a new task.

FIG. 8 shows an example of a method 800 used by the Predictor 525 in response to a new task. Steps 801-803 are executed by the Prediction Manager component 601. The method 800 starts and proceeds to the setting step 801 where the value of the variable TASK_NOTIF is set to the next new task notification in New Task Notifications 570 received by the Predictor 525. Processing then proceeds to a step 802 where the new task notification stored in the variable TASK_NOTIF is removed from the Notifications store 565.

Processing then proceeds to a step 803 where the Prediction Manager 601 sets the variable TASK_ID to the task ID in TASK_NOTIF.

Processing then proceeds to a setting step 805 where the estimated duration of the task stored in the variable TASK_NOTIF, whose complexity is stored in the variable COMPLEXITY, is estimated by the Task Duration Estimator 602 and is stored in a variable EST_DURATION by the Prediction Manager 601. The estimated duration of the task is an estimate, based on the complexity associated with the task, of the difference in system time from when a Task is dispatched for execution by the Dispatcher 530 to when it completes and the worker thread signals its availability to the Dispatcher 530. The process of estimating tasks durations will be described later with reference to FIG. 18. Prior to completion of the step 805, the Task Duration Estimator 602 sets a variable EST_DURATION to the estimated duration of the task stored in the variable TASK_NOTIF. The estimated duration of the task is used by the Predictor 525 to update its information about the times of future events and to determine if a re-prediction needs to be performed.

Processing then proceeds to a step 806 where the Prediction Manager 601 creates a new predicted task with a task ID value equal to the value stored in the variable TASK_ID and an estimated duration equal to the value stored in the variable EST_DURATION. The Prediction Manager 601 stores the new predicted task in the variable PRED_TASK. Processing then proceeds to a step 807 where the Prediction Manager 601 inserts PRED_TASK into the Predicted Task Queue 606. PRED_TASK and EST_DURATION will be used in the determination of the durations of future events.

Processing then proceeds to a step 808 where the Re-prediction Determiner 604 determines whether a re-prediction of future event times needs to be performed. Details of the calculations made by the Re-prediction Determiner 604 will be described later with reference to FIG. 10. Prior to completion of the step 808, the Re-prediction Determiner 604 sets a Boolean variable REPREDICT to True or False, reflecting whether a re-prediction needs to be performed or does not need to be performed, respectively.

Processing then proceeds to a selection step 809, where the value of REPREDICT is checked. If it is determined that re-prediction is required (i.e. the variable REPREDICT is True), then processing proceeds to a step 711, where the re-prediction of future event times is performed by the Event Time Predictor 605 (described later with reference to FIG. 15).

Processing then proceeds to a step 712, where the predicted times of future events are stored in the Event Predictions Store 607 by the Event Time Predictor 605. Processing terminates upon the completion of the step 712.

If at the selection step 809 it was determined that re-prediction was not required (i.e. the variable REPREDICT is False), then the process 800 terminates.

Figure 9:
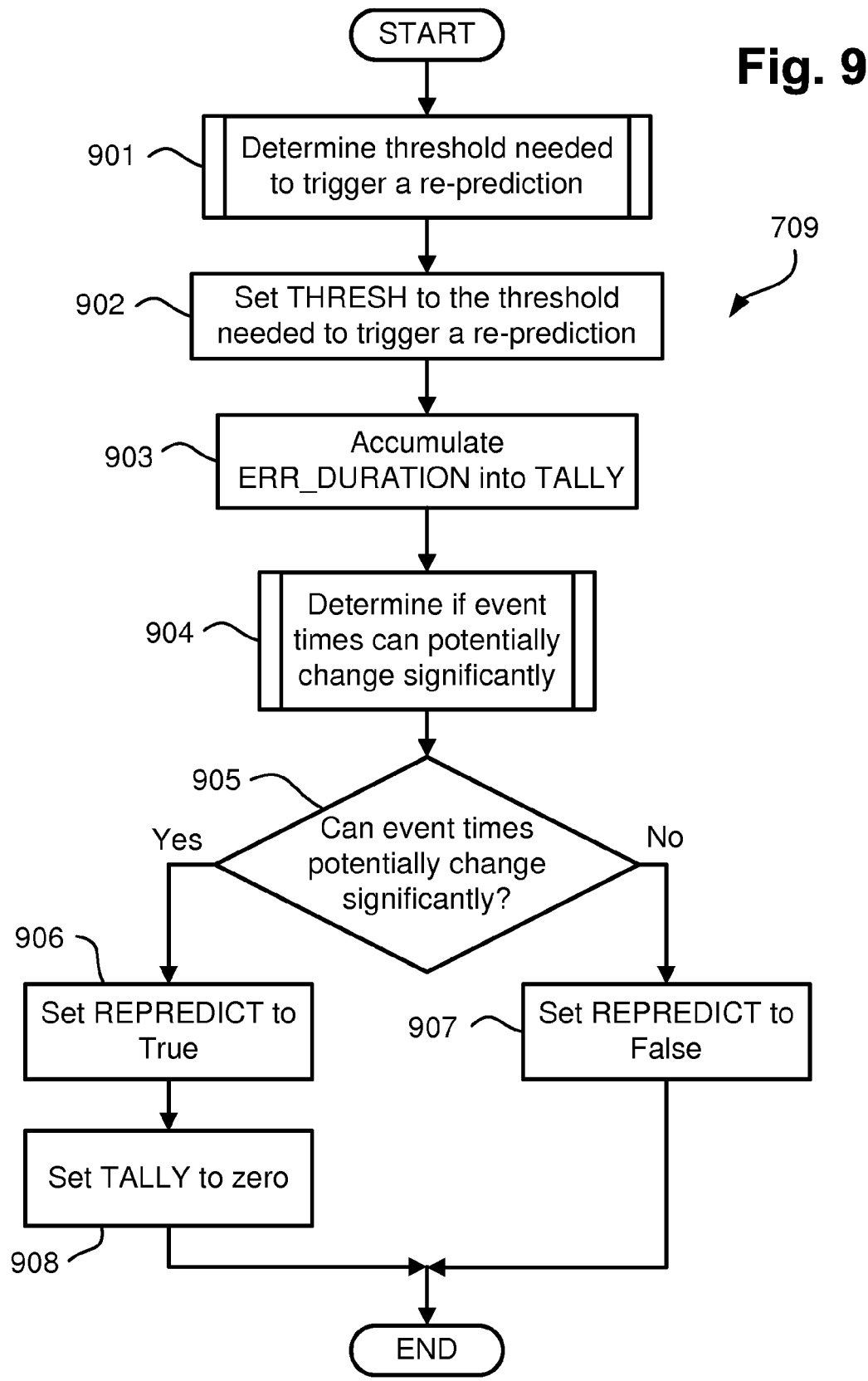
FIG. 9 shows a process for the determination of whether a re-prediction is required in response to a task finishing execution.

FIG. 9 shows the process 709 of determining if a re-prediction of future event times is required in response to a task finishing execution, this being performed by the Re-prediction Determiner 604 component.

The process 709 starts and proceeds to a determining step 901 in which a predetermined threshold needed to trigger a re-prediction of future event times is determined. In various examples of the current RPM arrangement, this threshold can be a single number OR predetermined criterion, a pair of numbers, or a more complicated series of conditions or criteria that need to be satisfied in order to trigger a re-prediction. In the described RPM arrangement, this threshold is a pair of numbers that indicate the maximum and minimum values of a tally (described later), for triggering the re-prediction of the times of future events. The process 901 of determining this threshold will be described later with reference to FIG. 11. Processing then proceeds to a step 902 where the threshold needed to trigger a re-prediction of future event times determined at the step 901 is stored in a variable THRESH.

Processing then proceeds to a step 903, where the error in the estimated task duration stored in the variable ERR_DURATION at the step 708 of FIG. 7 is added to an accumulation of such errors stored in a variable TALLY. The result of the step 903 is stored in the variable TALLY. This tally is an indication of the potential of change in the times of future events if a re-prediction were to be performed. Initially the value of TALLY is set to zero.

Processing then proceeds to a step 904, where it is determined if the times of future events can potentially be changed significantly after incorporating the effects of the error stored in the variable ERR_DURATION in step 903. This process depends on the threshold stored in the variable THRESH, the tally stored in the variable TALLY, the error stored in the variable ERR_DURATION, and the characteristics of the future events. This process will be described later with reference to FIG. 12. Prior to completion of the step 904, the Re-prediction Determiner 604 sets a Boolean variable SIGNIFICANT to True or False, depending on whether times of future events can potentially be changed significantly.

Processing then proceeds to a decision step 905, where the determination of whether event times can potentially change significantly is performed. If it is determined that event times can potentially change significantly (i.e. the variable SIGNIFICANT is True), processing proceeds to a step 906, where the Boolean variable REPREDICT is set to True. Processing then proceeds to a step 908, where the value of the tally stored in the variable TALLY is reset to a value of zero. Processing terminates upon the completion of the step 906.

If it is determined at the step 905 that future event times cannot potentially change significantly (i.e. the variable SIGNIFICANT is False), processing proceeds to a step 907 where the Boolean variable REPREDICT is set to False. Processing terminates upon the completion of the step 907.

Figure 10:
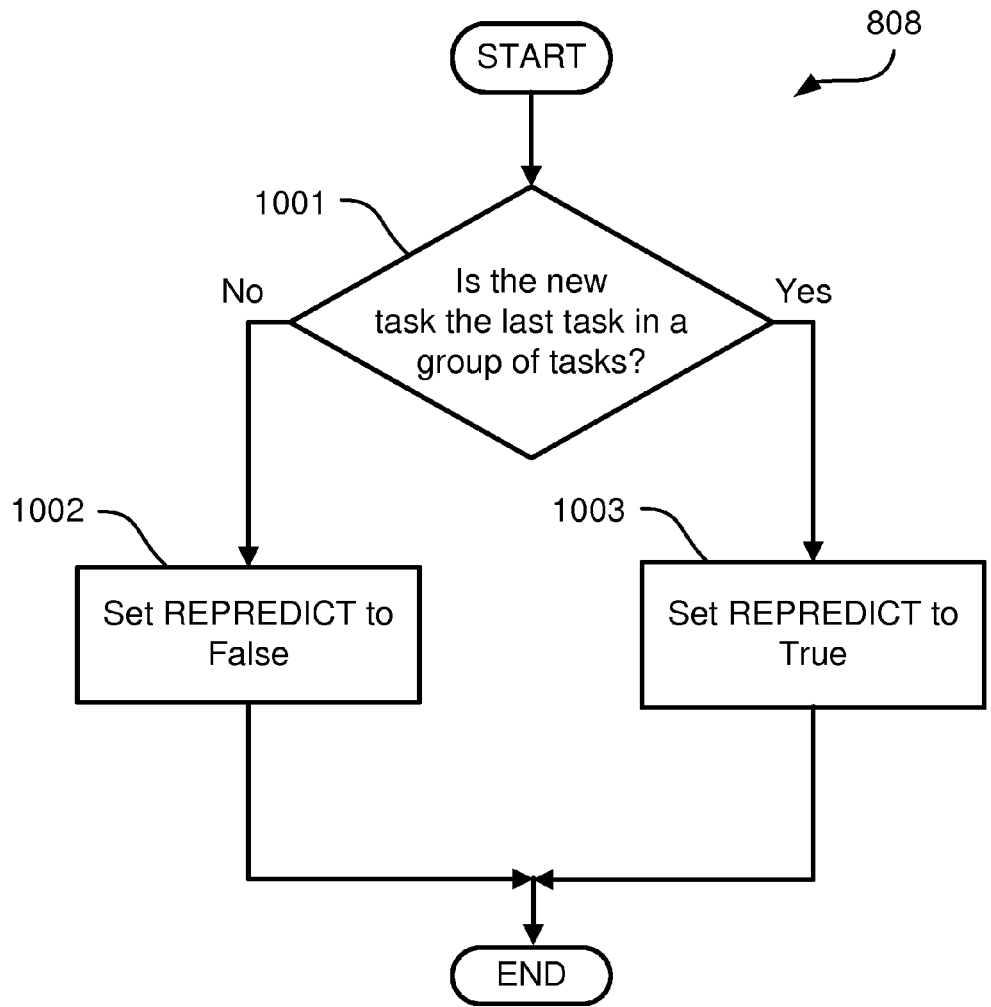
FIG. 10 shows a process for the determination of whether a re-prediction is required in response to a new task.

FIG. 10 depicts the process 808 of determining if a re-prediction of future event times is required in response to a new task in accordance with the described RPM arrangement. The determining of whether a re-prediction of the times of future events is required is performed by the Re-prediction Determiner 604 component of the Predictor 525.

The process 808 starts and proceeds to a decision step 1001, where it is determined whether the new task stored in the variable TASK_NOTIF is the last task in a group of new tasks. This determination is made by analysing the flag in the new task notification stored in the variable TASK_NOTIF. If this flag was previously set by the Task Generator 560, it is determined that the new task is the last task in a group of tasks. Otherwise, it is determined that the new task is not the last task in a group of tasks. The determination of whether this flag is set by the Task Generator 560 has been described previously with reference to FIG. 6.

If it is determined at the step 1001 that the task in TASK_NOTIF is not the last task in a group of new tasks, processing proceeds to a step 1002 where the Boolean variable REPREDICT is set to False. (If there are additional new tasks to be processed in the group of new tasks, there is very little to be gained by performing a re-prediction after processing every task.) Processing terminates upon the completion of the step 1002.

If it is determined at the step 1001 that the new task is the last task in a group of new tasks, processing proceeds to a step 1003, where the Boolean variable REPREDICT is set to True by the Re-prediction Determiner 604. (As the new task is the last task in the group of new tasks to be processed, the times of future events may change significantly and it is unknown when the next new task will arrive. A re-prediction must therefore be performed.) Processing terminates upon the completion of the step 1003.

In practice, in a multi-threaded RIP, most tasks will be parts of larger groups of new tasks, associated with new pages that are to be input to the multi-threaded RIP. Using the process 808 just described, re-predictions in response to new tasks will generally only be performed once per page or once per group of pages.

Figure 11:
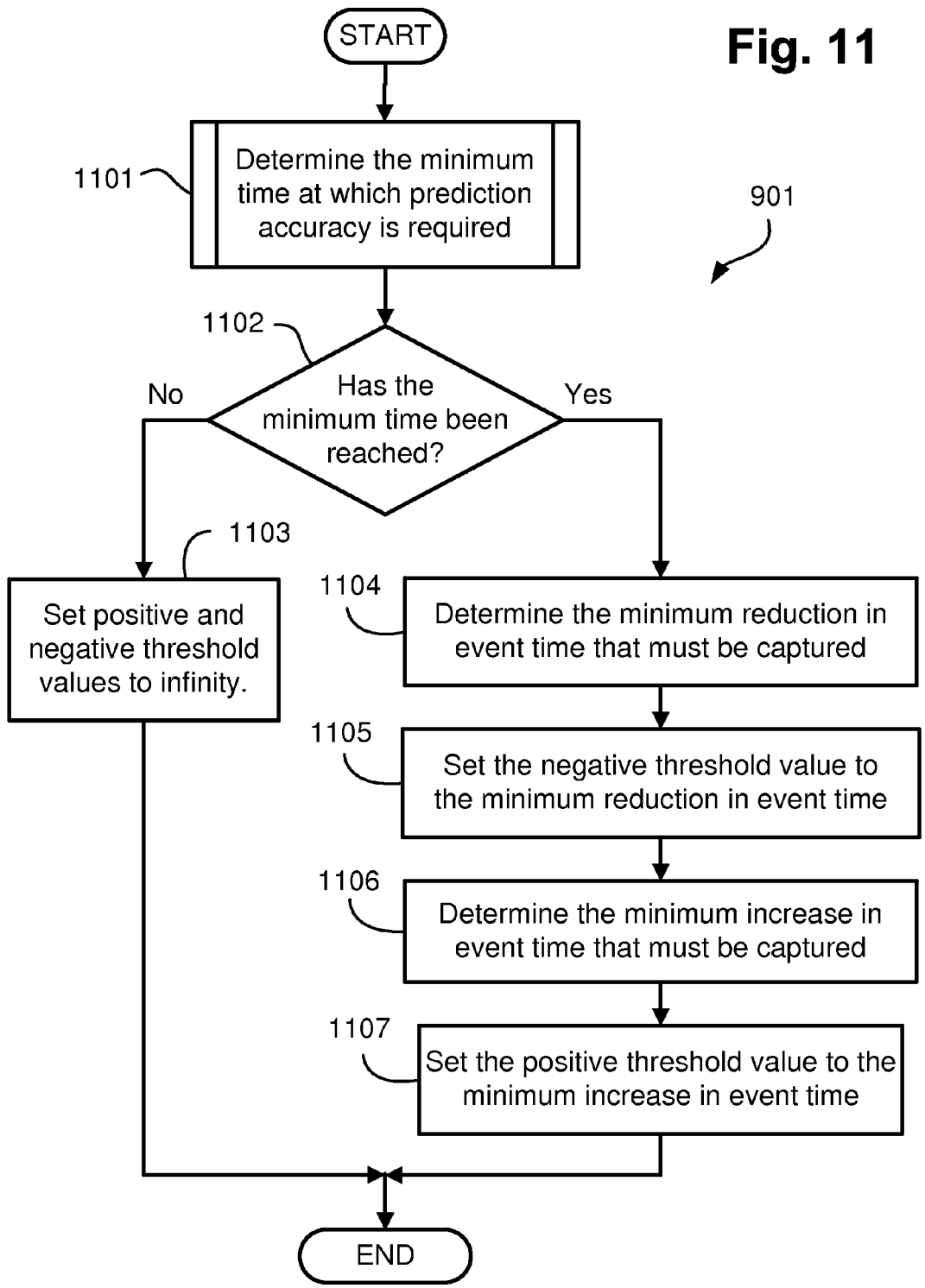
FIG. 11 shows a process for the determination of a threshold to be used for determining if a re-prediction is required.

FIG. 11 shows the process 901 of determining the threshold for determining if a re-prediction is required is performed by the Re-prediction Determiner 604. As described previously with reference to FIG. 9, the threshold may be a single number that is compared with a tally, or something more complex. In the described example of the RPM arrangement, the threshold consists of a maximum value, which is positive, and a minimum value, which is negative. A tally, which can also be either positive or negative, is compared with this threshold, and is deemed to satisfy the threshold if the tally falls outside the range established by the maximum value and the minimum value. The process of determining whether a re-prediction is required, which involves comparing the tally with the threshold in the described example of the current RPM arrangement, will be described later with reference to FIG. 12.

The process 901 starts and proceeds to a step 1101 where the minimum time at which prediction accuracy is required for the times of future events is determined. For many future events in a multi-threaded RIP, such as the time to start a print engine, there will be a time before which an accurate prediction is not required. For example, there will be a period of time where a print engine must not be started if stalls are to be avoided, no matter what the errors may be in future task execution. There is therefore little gain to be made by performing re-predictions of an engine start time during this period of time. The process of determining this minimum time at which prediction accuracy is required will be described later with reference to FIG. 13. Prior to completion of the step 1101, the Re-prediction Determiner 604 sets a Boolean variable MINIMUM_TIME to the minimum time at which prediction accuracy is required for the times of future events.

Processing then proceeds to a deciding step 1102, where it is determined whether the minimum time at which prediction accuracy is required has been reached. This is done by simply comparing the current time with the minimum time determined at step 1101 stored in variable MINIMUM_TIME. If it is determined at the step 1102 that the minimum time has not been reached, processing proceeds to a step 1103, where the positive threshold value is set to positive infinity, and the negative threshold value is set to negative infinity. Setting the threshold to these values has the effect of preventing any re-prediction from taking place. Processing terminates upon the completion of the step 1103. It is noted that other methods of disabling the re-prediction step can also be used. For example, a flag can be set to a value that indicates that re-prediction is not to be performed.

If it is determined at the step 1102 that the minimum time has been reached (i.e. the current time is greater than or equal to the minimum time stored in the variable MINIMUM_TIME), then processing proceeds to a step 1104, where the minimum reduction in the time of the future event that must be captured is determined Processing then proceeds to a step 1105, where the negative threshold value is set to the minimum reduction in the time of the future event that must be captured that was determined at the step 1104. If the tally drops below this value, it is determined by the Re-prediction Determiner 604 that the time of the future event (e.g. the engine start time) can potentially be reduced by a significant amount. The minimum reduction in the time of the future event that must be captured will in general depend on the specific future event and the characteristics of the specific print system. In the disclosed example of the current RPM arrangement the future event is the best time to start a print engine. If, for example, the print engine can print one page every one second, a potential reduction in the engine start time by one second may be deemed a significant amount. The negative threshold value will in this case be set to one second.

Processing then proceeds to a step 1106, where the minimum increase in the time of the future event that must be captured is determined Processing then proceeds to a step 1107, where the positive threshold value is set to the minimum increase in the time of the future event that must be captured that was determined at the step 1106. If the tally increases above this value, it is determined by the Re-prediction Determiner 604 that the time of the future event (e.g. the engine start time) can potentially be increased by a significant amount. If the engine start time can potentially be increased, and a re-prediction is not made, the engine may be started too early and stalls may result. It is therefore important when predicting the best time to start a print engine that potential increases in engine start time are captured and re-predictions are performed. In the described example of the RPM arrangement where the future event is the best time to start a print engine, the minimum increase is set to a very low value. Processing terminates upon the completion of the step 1107.

Note that these threshold values may not be calculated on every execution of this process. In some RPM arrangement examples, these threshold values may be set to fixed values that are dependent on the characteristics of the tasks and the state of the system. In other RPM arrangement examples, the distance between these threshold values may reduce in value as the time of the future event is approached, in order to capture smaller changes in the time of the future event.

Figure 12:
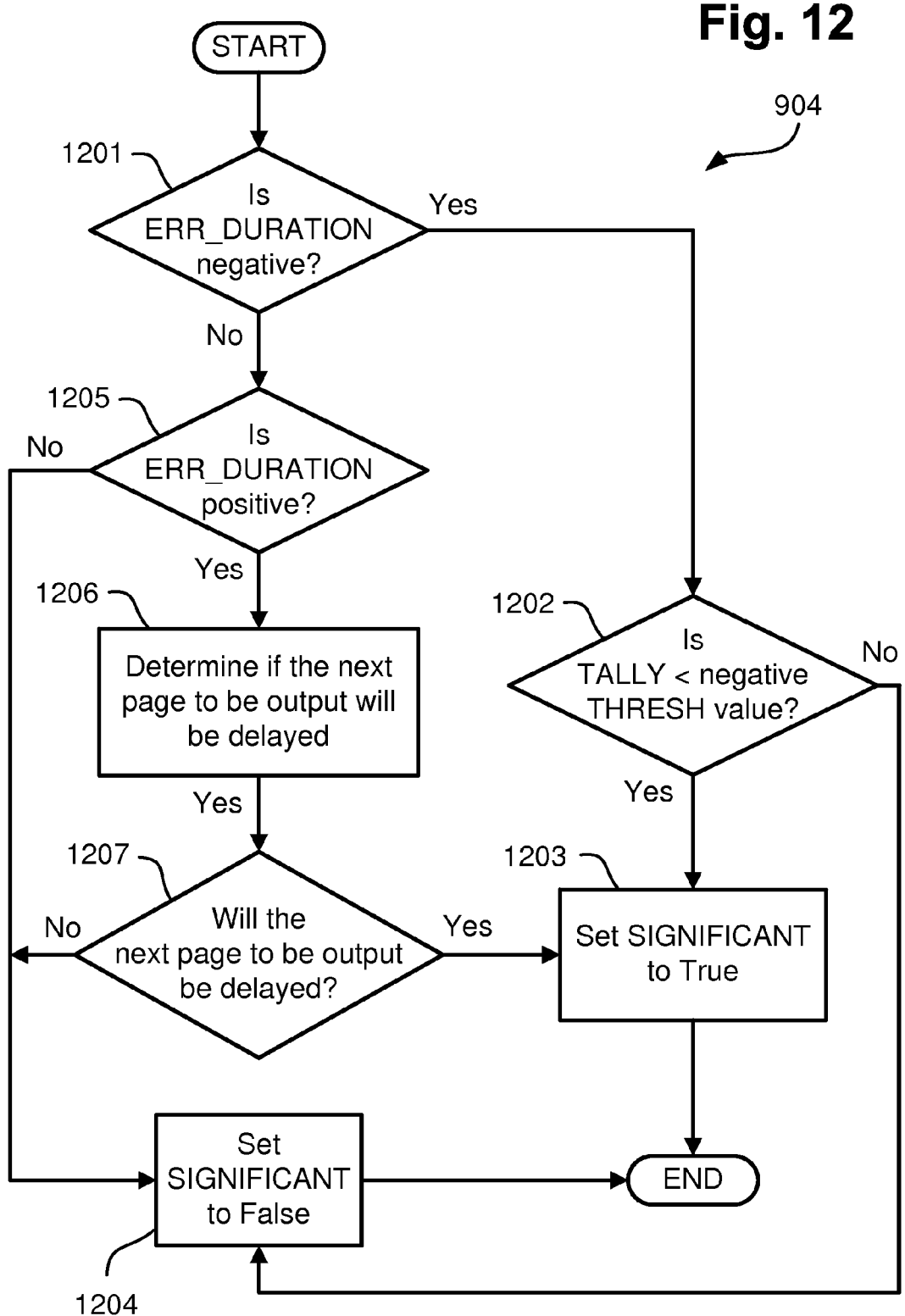
FIG. 12 shows a process for the determination of whether the times of future events can potentially change significantly in response to a task finishing execution.

FIG. 12 shows the process 904 for determining if the times of future events can potentially change significantly in accordance with an example of the RPM arrangement. As described previously, this process may depend on the threshold stored in the variable THRESH (calculated previously at step 901 with reference to FIG. 9), the tally stored in the variable TALLY, the error stored in the variable ERR_DURATION, and the characteristics of the future events. In the described RPM arrangement example, this process uses the threshold stored in the variable THRESH, the tally stored in the variable TALLY, the error stored in the variable ERR_DURATION, and other information that is specific to the future event and future schedule.

The process 904 starts and proceeds to a decision step 1201, where it is determined whether the error in estimated task duration stored in the variable ERR_DURATION is negative. If the error stored in the variable ERR_DURATION is negative, the task stored in the variable TASK_NOTIF finished earlier than estimated. In this case, the time of the future event can potentially move forward in time. In the preferred RPM arrangement, where the future event corresponds to the starting of a print engine, determining that the time of the future event moving forward in time means that the total print time of all pages can potentially be made smaller. Therefore, if a re-prediction is not made, the engine start time may not be optimal, but it will not result in stalls in the print engine.

If it is determined at the step 1201 that the error in estimated task duration stored in the variable ERR_DURATION is negative, processing then proceeds to a step 1202, where the tally stored in the variable TALLY is compared with the negative value of the threshold stored in the variable THRESH. If at the step 1202 it is determined that the value of TALLY is less than the negative value of THRESH, processing proceeds to a step 1203, where the Boolean variable SIGNIFICANT is set to True, as the time of the future event will potentially change significantly. Processing terminates upon the completion of the step 1203.

If it is determined at the step 1202 that the value of TALLY is not less than the negative value of THRESH, processing proceeds to a step 1204, where the Boolean variable SIGNIFICANT is set to False, as the time of the future event will not change significantly. Processing terminates upon the completion of the step 1204.

If it is determined at the step 1201 that the error in task duration estimation stored in the variable ERR_DURATION is not negative, processing proceeds to a step 1205, where it is determined whether the value of ERR_DURATION is positive. If the value of ERR_DURATION is positive, the task has finished later than estimated. This means that the time that the print engine is started can potentially be delayed. If this delay is not captured by re-predicting the time of this future event, stalls in the print engine may occur.

If it is determined at the step 1205 that the value of ERR_DURATION is positive, processing proceeds to a step 1206, where it is determined if the next page to be output will be delayed. This may involve some scheduling of future tasks until the time that the next page to be output can be determined. This time is then compared with the previous time at which the page will be output, to determine if it will be delayed as a result of the task with task ID finishing later than estimated.

Processing then proceeds to a step 1207 where the determination of whether the next page to be output will be delayed is performed. If the next page to be output will be delayed, processing proceeds to the step 1203 where the Boolean variable SIGNIFICANT is set to True, as the time of the future event will potentially change significantly. Processing terminates upon the completion of the step 1203. If it is determined at the step 1207 that the next page to be output will not be delayed, processing proceeds to the step 1204, where the Boolean variable SIGNIFICANT is set to False, as the time of the future event will not change significantly. Processing terminates upon the completion of the step 1204.

If it is determined at the step 1205 that the value of ERR_DURATION is not positive, processing proceeds to the step 1204. If the value of ERR_DURATION is not positive, the value of ERR_DURATION is zero, and the error in task duration estimation is zero (it was previously determined at the step 1201 that the value of ERR_DURATION is not negative). Processing proceeds to the step 1204, where the Boolean variable SIGNIFICANT is set to False, as the time of the future event will not change significantly. Processing terminates upon the completion of the step 1204.

Figure 13:
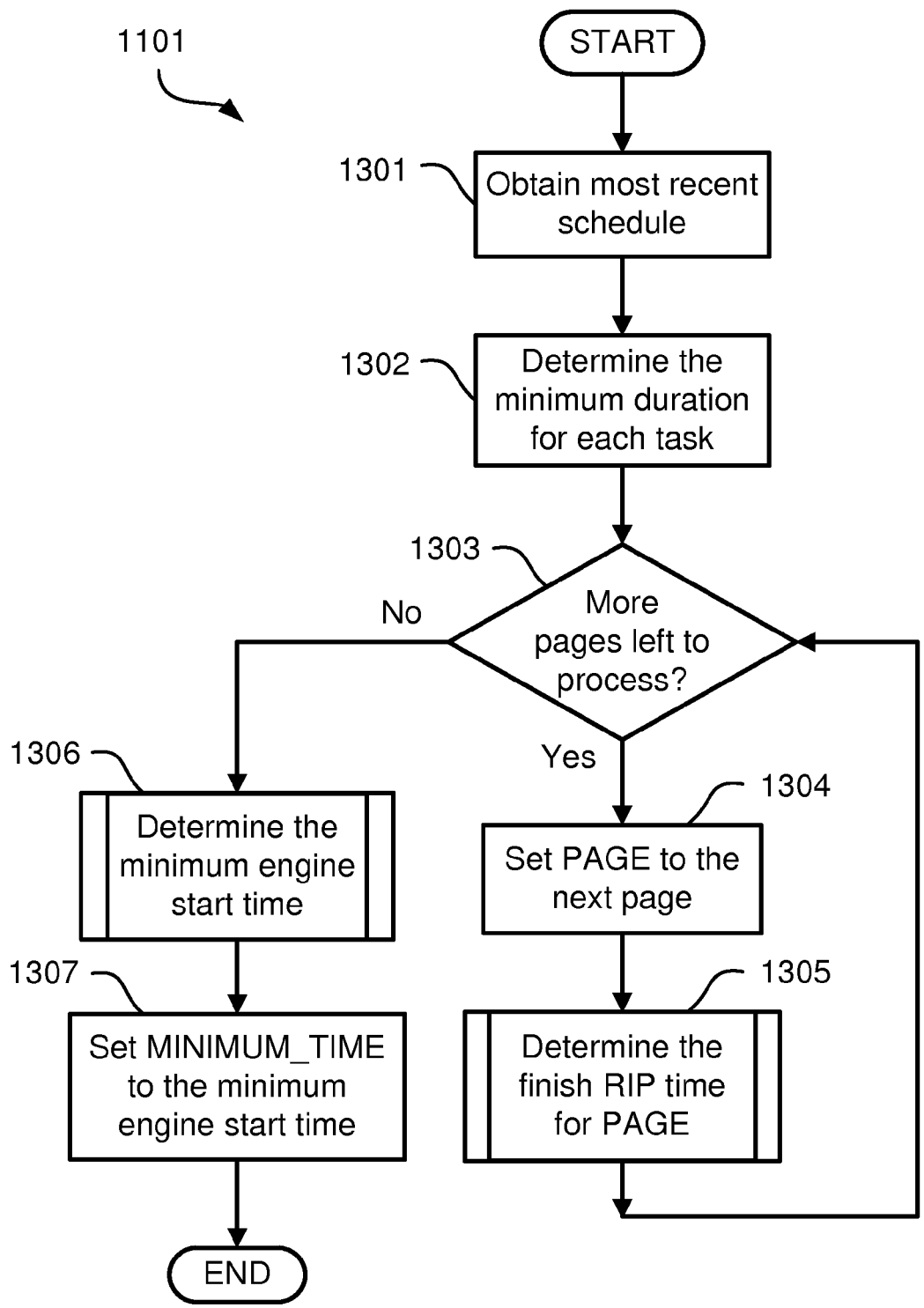
FIG. 13 shows a process for the determination of the time at which prediction accuracy is required.

FIG. 13 shows the process 1101 of determining the minimum time at which prediction accuracy is required. The process 1101 starts and proceeds to a step 1301, where the most recent schedule generated during the most recent re-prediction is obtained. This schedule was stored by the Event Time Predictor 605 in the Event Predictions Store 607 on the most recent re-prediction made. This schedule represents the most recent knowledge of the future execution of tasks onto threads.

Processing then proceeds to a step 1302, where the minimum duration for each predicted task in the schedule is determined. This may involve utilising the complexity of each task in the schedule to determine a lower bound on how long that task can feasibly take to execute. In the described example of the RPM arrangement, this calculation is similar to the calculation of the duration of the task performed by the Task Duration Estimator 602 described with reference to FIG. 18.

In the described example of the current RPM arrangement, the future event being predicted is the time that a print engine should be started. The remainder of the process 1101 involves predicting the time that a print engine will be started if each of the remaining predicted tasks executed in the minimum durations calculated at the step 1302. The remaining steps of the process 1101 are therefore similar to the process 711 for predicting an engine start time, described with reference to FIG. 14.

Processing then proceeds to a step 1303 where it is determined if there are more pages that have not yet been printed and have not been processed by the Re-prediction Determiner 604 during this process, 1101. The described example method of predicting the minimum possible engine start time involves first predicting the minimum time that the RIP process for each page that is not yet printed will take. If it is determined at the step 1303 that there are pages left to process, processing proceeds to a step 1304, where the next page to determine the minimum finish RIP time for is set to the variable PAGE.

Processing then proceeds to a step 1305, where the minimum finish RIP time for the page stored in variable PAGE is determined by the Event Time Predictor 605. This is the minimum predicted time within which the RIP process for the page will be completed. This step 1305 is the same as one of the steps performed during the prediction of the actual engine start time (described with reference to FIG. 14), with the exception that the minimum durations of each task are used instead of the estimated task durations. This process will be described in more detail with reference to FIG. 16. Prior to completion of the step 1305, the Event Time Predictor 605 sets a variable RIP_TIME to the minimum possible finish RIP time for the page stored in variable PAGE. Processing then returns to the step 1303.

If it is determined at the step 1303 that there are no more pages left to process, processing proceeds to a step 1306, where the minimum engine start time is predicted by the Event Time Predictor 605. This prediction is based on the predicted minimum finish RIP times for each page that has not been printed. This step 1306 is the same as one of the steps performed during the prediction of the actual engine start time (described with reference to FIG. 14), with the exception that the minimum RIP finished times of each page is used instead of the actual RIP finished times. This process, 1306, will be described in more detail with reference to FIG. 17. Prior to completion of the step 1306, the Event Time Predictor 605 sets a variable START_TIME to the minimum possible engine start time.

Processing then proceeds to a step 1307, where the minimum engine start time determined at the step 1306 and stored in variable START_TIME is set to the variable MINIMUM_TIME. Processing terminates upon the completion of the step 1307.

It is noted that this process 1101 should not be executed each time the minimum possible engine start time is required. If a re-prediction has not been performed since the last time the minimum possible engine start time was required, the calculated value will not have changed. Therefore, it is advantageous to store the calculated minimum possible engine start time in memory, and read this stored value in preference to calculating it again where possible. An example of the minimum time at which prediction accuracy is required, for the example of determining the best time to start a print engine, will later be described with reference to FIG. 20.

Figure 14:
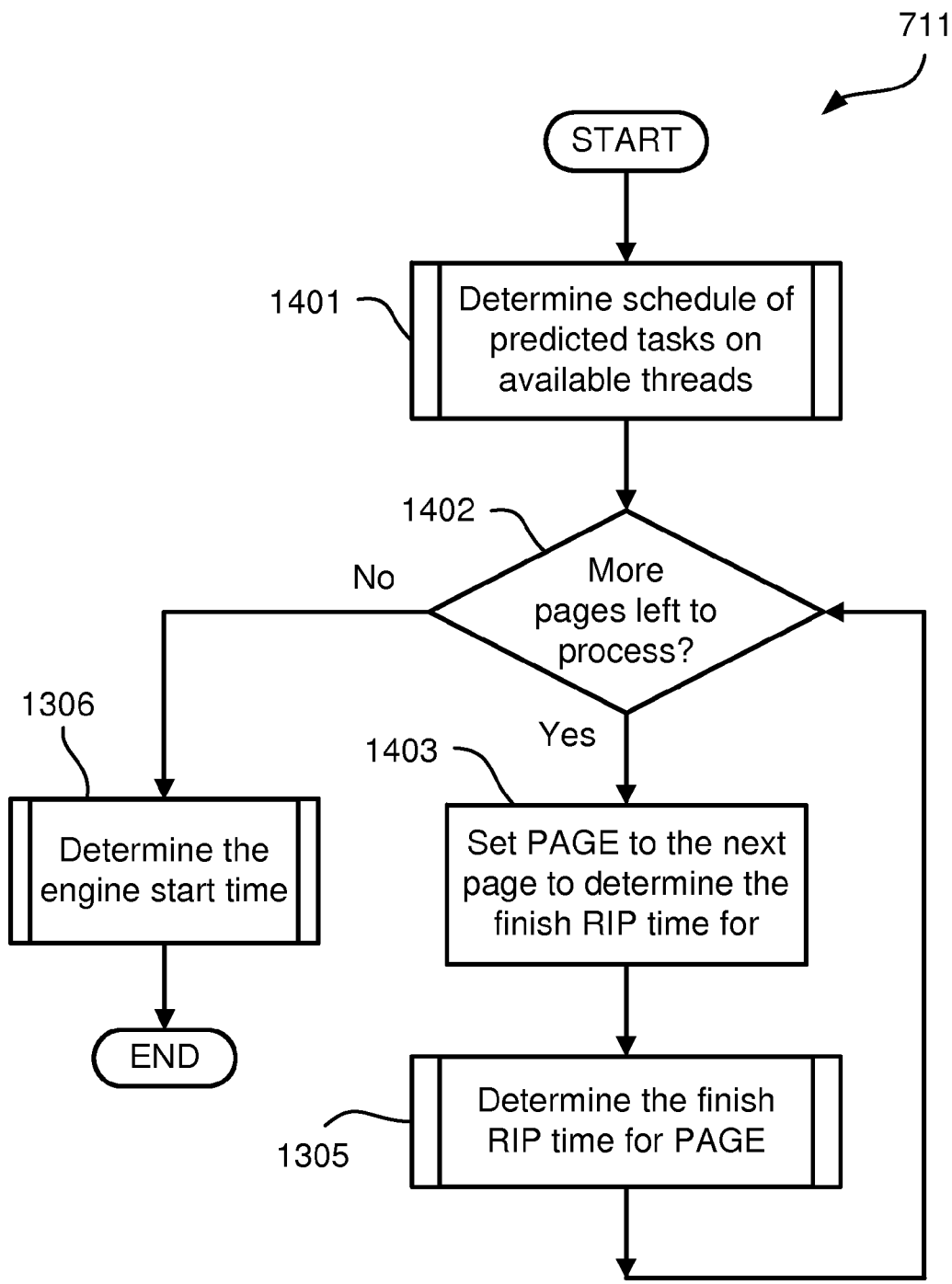
FIG. 14 shows the process of re-predicting the times of future events.

FIG. 14 shows the process 711 for re-predicting the time of a future event. As discussed earlier, the example used to describe the present RPM arrangement is determining the best time to start a print engine. The process 711 therefore describes the prediction of the best time to start the Printer Engine 195. The goal is to start the Printer Engine 195 at a time such that engine stalls are avoided and total print time is minimised. In general, the process by which the time of the future event is predicted is specific to the particular event, but with little modification the techniques described in this example can easily be applied to future events other than printing commencement by print engines.

The process 711 starts and proceeds to step a 1401 where a schedule of the predicted tasks in the Predicted Task Queue 606 on threads that are available to execute tasks is generated. This step attempts to mimic the future behaviour of the multi-threaded RIP 2405 based on the tasks that are currently known to have not started execution and the estimated durations of those tasks. This process will be described in more detail with reference to FIG. 15.

Processing then proceeds to a step 1402 where it is determined if there are more pages that have not yet been printed and have not been processed by the Event Time Predictor 525 during this process, 711. The described RPM arrangement method example of predicting the engine start time involves first predicting the time to be taken by the RIP process for each page that is not yet printed. If it is determined at the step 1402 that there are pages left to process, processing proceeds to step a 1403, where the next page to determine the finish RIP time for is set to the variable PAGE.

Processing then proceeds to a step 1305, where the finish RIP time for the page stored in variable PAGE is determined.

This is the predicted time that the RIP process for the page will be completed. This process will be described in more detail with reference to FIG. 16. Prior to completion of the step 1305, the Event Time Predictor 605 sets a variable RIP_TIME to the finish RIP time for the page stored in variable PAGE. Processing then returns to the step 1402.

If it is determined at the step 1402 that there are no more pages left to process, processing proceeds to a step 1306, where the engine start time is predicted. This prediction is based on the predicted finish RIP times for each page that has not been printed. This process will be described in more detail with reference to FIG. 17. Prior to completion of the step 1306, the Event Time Predictor 605 sets a variable START_TIME to the print engine start time that ensures that stalls are avoided and total print time is minimised. Processing terminates upon the completion of the step 1306.

Figure 15:
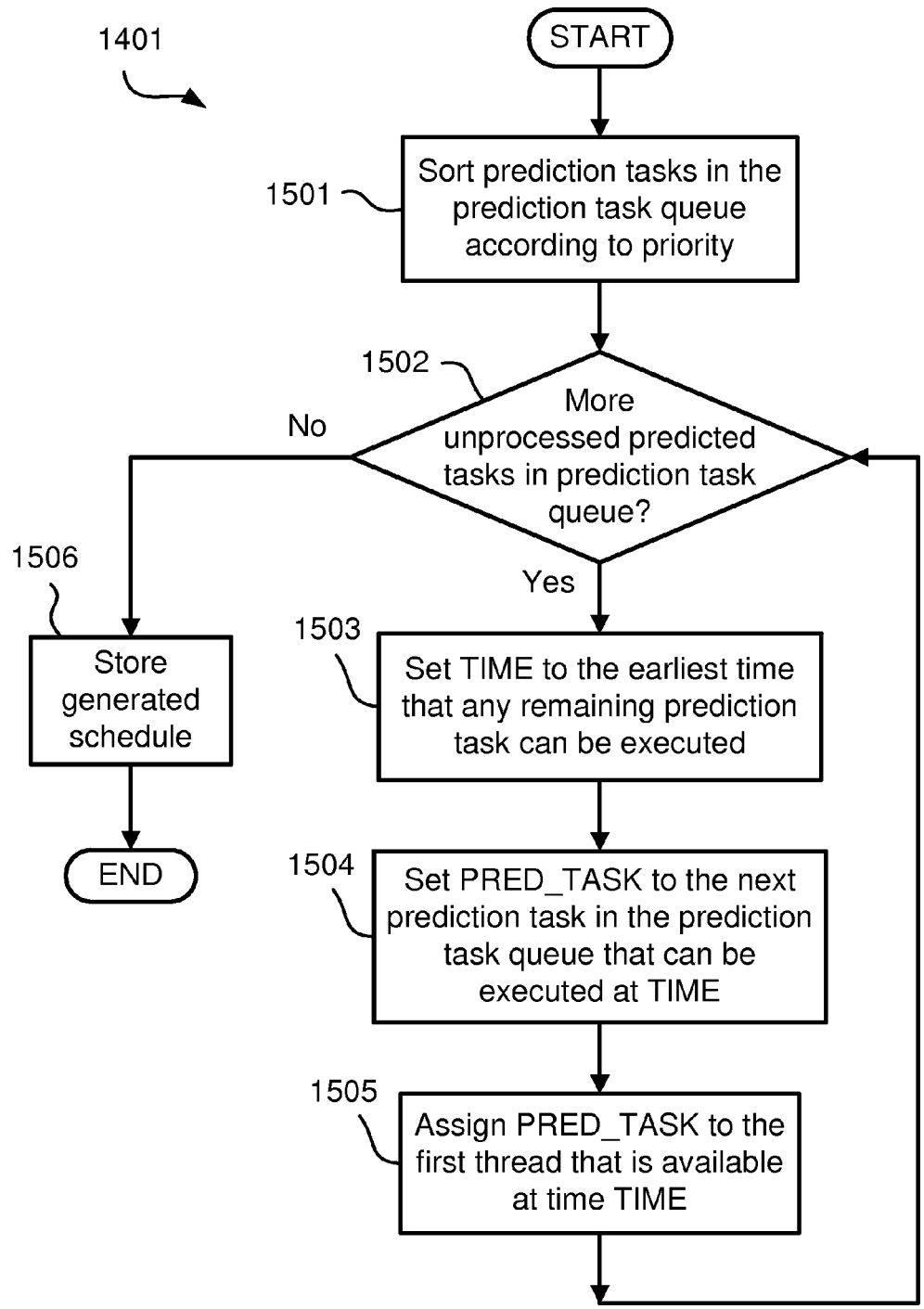
FIG. 15 shows a process for the determination of a schedule of tasks that have not yet been executed.

FIG. 15 shows the process 1401 of determining a schedule of predicted tasks. The process 1401 starts and proceeds to a step 1501, where predicted tasks in the Predicted Task Queue 606 are sorted by the Event Time Predictor 605 according to task priority. As described earlier with reference to FIG. 5, each task to be executed in a multi-threaded RIP is given a priority. When determining a schedule of predicted tasks during the re-prediction of future event times, the Event Time Predictor 605 uses the same priorities for predicted tasks as the Scheduler 520 uses for tasks that will be executed in the multi-threaded RIP.

Processing then proceeds to a step 1502, where it is determined whether there are more predicted tasks in the Predicted Task Queue 606 remaining to be scheduled by the Event Time Predictor 605. If it is determined at the step 1502 that there are predicted tasks remaining to be scheduled, processing proceeds to a step 1503, where the earliest time that any of the predicted tasks left to process can be executed is determined and set to a variable TIME. In the described example of the RPM arrangement, this step involves searching the predicted tasks left to process in order of highest priority to lowest priority until a predicted task is found that can be executed at the earliest possible time. The earliest possible time is the earliest time at which one of the available threads will become available. If there is no task can be executed at the earliest possible time, the task that can be executed the earliest is found. Many tasks cannot be executed until other tasks have completed execution. Also, there must be space on the output buffer of a task for the task to be executed. It is for these reasons that a task may not be able to be executed at a given time. These dependencies and buffer limits are observed by both the Scheduler 520 and the Event Time Predictor 605, which mimics the behaviour of the scheduler when performing predictions.

Processing then proceeds to a step 1504, where the predicted task in the Predicted Task Queue 606 that has the highest priority and can be executed at the time stored in variable TIME is set to the variable PRED_TASK. In the described example of the RPM arrangement, this step involves searching the predicted tasks in the Predicted Task Queue 606 that have not been processed, from highest priority to lowest priority, until a predicted task that can be executed at the time stored in variable TIME is found. Processing then proceeds to a step 1505, where the predicted task PRED_TASK is assigned to the first thread that is available at the time stored in variable TIME. Processing then returns to the step 1502.

If it is determined by the Event Time Predictor 605 at the step 1502 that there are no more unprocessed predicted tasks in the Predicted Task Queue 606, processing proceeds to a step 1506, where the Event Time Predictor 605 stores the generated schedule of future predicted tasks in the Event Predictions Store 607. The stored schedule will be used by the Event Time Predictor 605 to determine the predicted RIP time of each page (described later with reference to FIG. 16), and to determine the minimum time at which prediction accuracy is required (described previously with reference to FIG. 13). Processing terminates upon completion of the step 1506.

Figure 16:
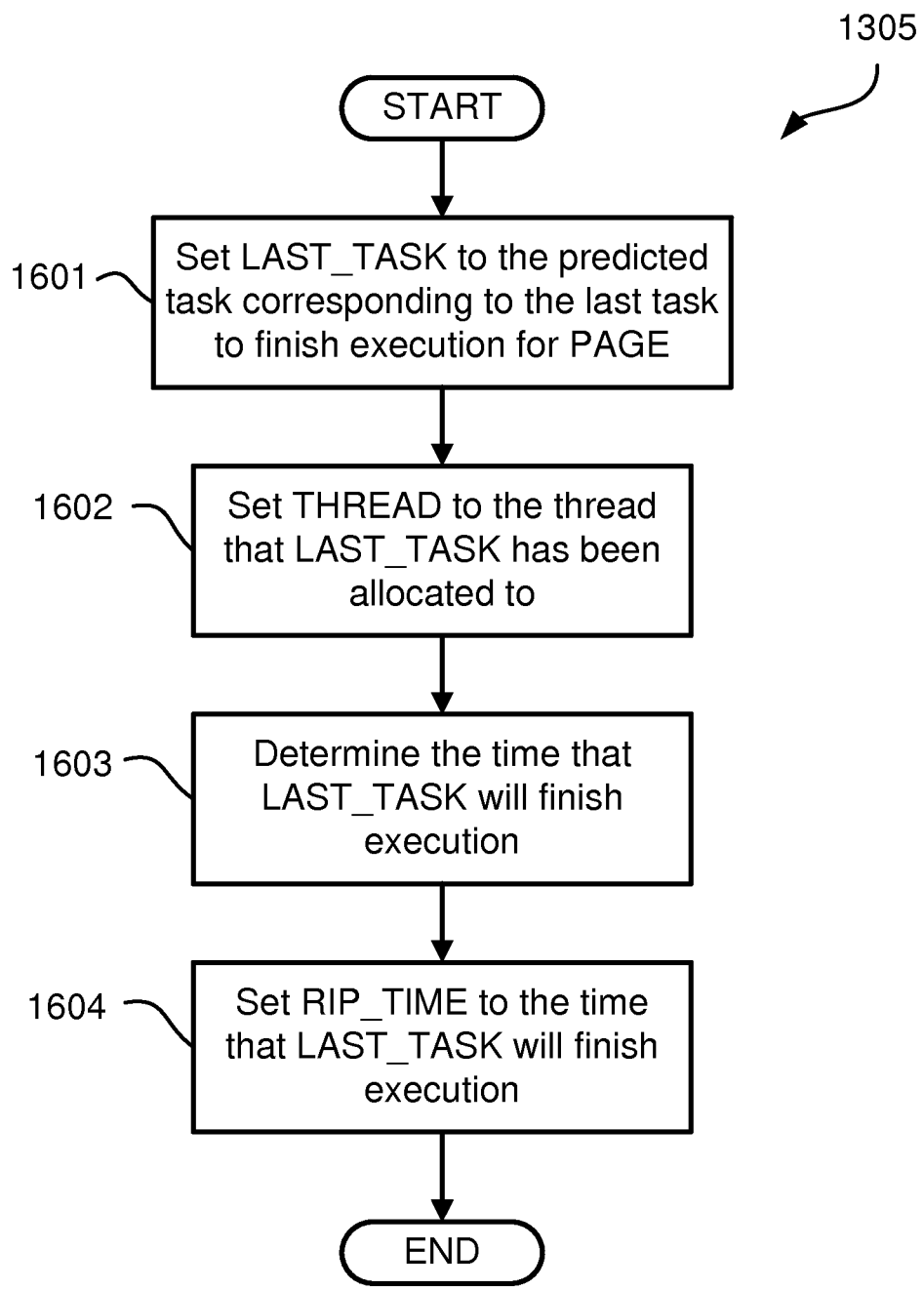
FIG. 16 shows a process for the prediction of the RIP time of a page.

FIG. 16 shows the process 1305 of determining the time that the RIP process for a page will be completed based on a schedule of predicted tasks. This process is invoked when determining the minimum time at which prediction accuracy is required (described previously with reference to FIG. 13), and when predicting the best time to start a print engine (described previously with reference to FIG. 14). In both cases, the process 1305 operates on a schedule of predicted tasks allocated to threads, where each predicted task is assigned a duration. The duration of a predicted task may be the minimum duration of the corresponding task (see the description with reference to FIG. 13), or the estimated duration of the corresponding task (see the description with reference to FIG. 14).

The process 1305 starts and proceeds to a step 1601, where the predicted task corresponding to the last task to be executed for the page stored in variable PAGE is located in the schedule of predicted tasks. In the described example of the RPM arrangement, this step involves searching the list of predicted tasks for each thread for all predicted tasks corresponding to the page. The predicted end time of each corresponding task is then calculated by adding the estimated duration of each predicted task that is scheduled to be executed before the predicted task on the thread on which the predicted task is allocated, to the current time, and then adding the duration of the predicted task. The predicted task corresponding to the task with the highest completion time is the last task for the page. The last task for the page is set to the variable LAST_TASK.

Processing then proceeds to a step 1602, where the thread in the schedule that the last predicted task has been allocated to is set to the variable THREAD. Processing then proceeds to a step 1603, where the time that the last predicted task stored in variable LAST_TASK will finish execution is determined. In the described example of the RPM arrangement, the time that the last predicted task finishes execution is calculated in a manner similar to that described at the step 1601. This time is calculated by adding the duration of each predicted task that is scheduled to be executed before the predicted task on the thread on which the predicted task is allocated, to the current time, adding the time during which the thread stored in variable THREAD is not allocated any predicted tasks, and then adding the duration of the predicted task.

Processing then proceeds to step 1604, where time that the last predicted task stored in variable LAST_TASK will finish execution is stored in a variable RIP_TIME by the Event Time Predictor 605. Processing terminates upon completion of the step 1604. An example of determining the RIP time for a page in accordance with the exemplary example will be described later with reference to FIG. 23.

Figure 17:
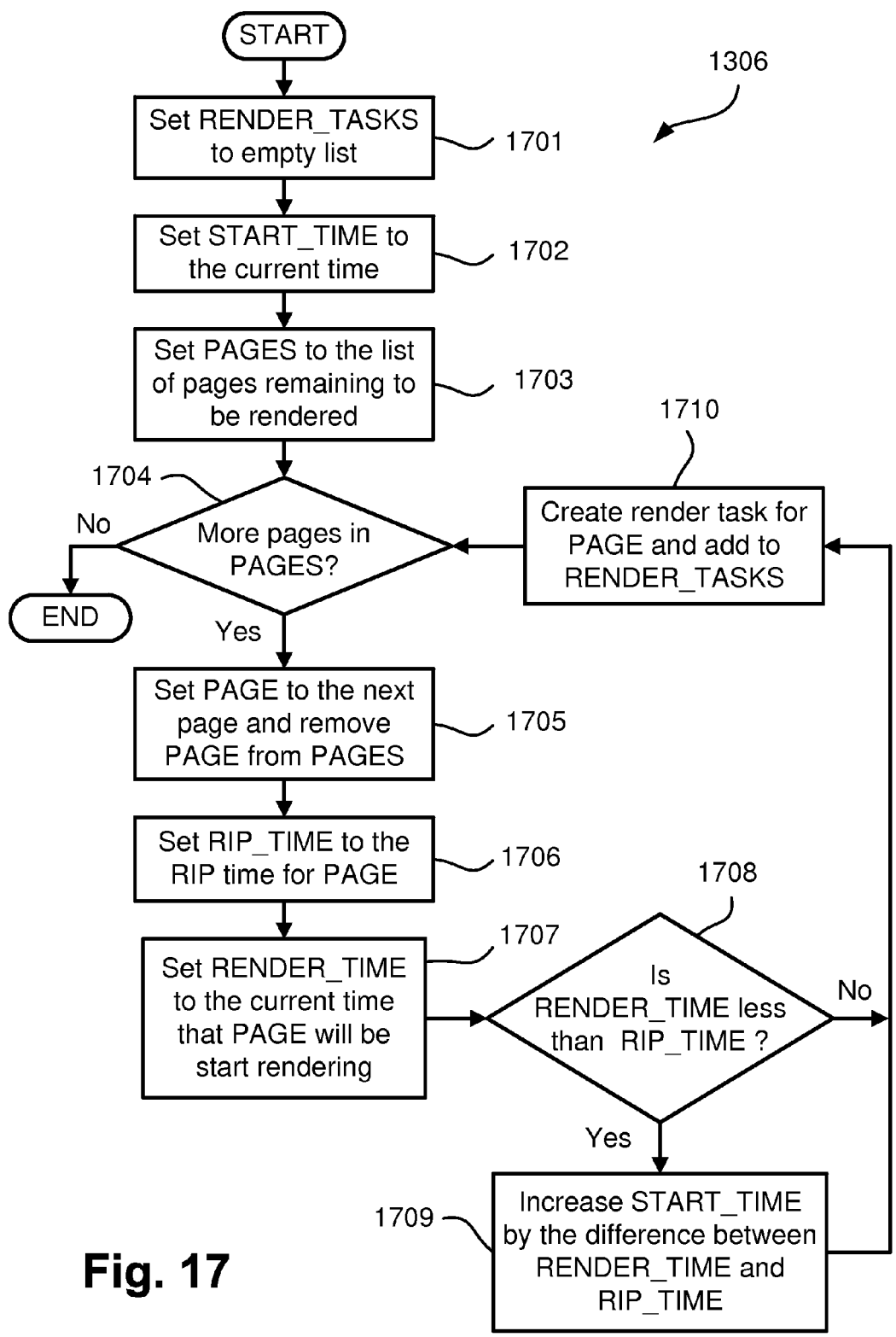
FIG. 17 shows a process for the determination of the start time of a print engine.

FIG. 17 shows the process 1306 for determining the time that a print engine can be started based on a the predicted RIP times of a number of pages, such that stalls are avoided and total print time is minimised. The process 1306 starts and proceeds to a setting step 1701, where an empty list is created and set to the variable RENDER_TASKS by the Event Time Predictor 525 component of the Predictor 525. This list will store a set of predicted tasks that represent the rendering and printing of all pages remaining to be printed. One such render predicted task is created for each page to be printed.

Processing then proceeds to a step 1702 where the current time is set to the variable START_TIME. This variable represents the current engine start time that satisfies the conditions of no stalls and a minimum total print time, for the pages that have currently been processed by the process 1306. This variable is updated as pages are processed, so that these conditions remain satisfied. At the end of the process 1306 the value of this variable is used to set the predicted engine start time that is the result of this re-prediction.

Processing then proceeds to a step 1703, where a list of all pages remaining to be printed is constructed, and set to the variable PAGES. This list is sorted by page number, such that the first page in the list is the page that will be printed next, and the last page in the list is the last page to be printed, of the pages that are currently known to the multi-threaded RIP. Processing then proceeds to a deciding step 1704, where it is decided whether all pages in PAGES have been processed.

If it is determined at the step 1704 that there are pages remaining to be processed, processing proceeds to a setting step 1705, where the next page to be processed in the list stored in variable PAGES is set to the variable PAGE. This page is also removed from the list of pages stored in the variable PAGES at the step 1705. This page will be used in the following steps to determine if the current engine start time stored in the variable START_TIME needs to be updated in order to satisfy the conditions that stalls are avoided and total print time be minimised.

Processing then proceeds to a step 1706, where the RIP time for the page stored in variable PAGE, that was previously calculated at the step 1305 with reference to FIG. 14, is set to the variable RIP_TIME. This is the predicted time that the RIP process for the page stored in variable PAGE will be completed by the multi-threaded RIP. A page can be rendered and printed by a print engine such as 195 only after it has finished the RIP process such as 2405. If the print engine has been started, and the next page that the print engine requires has not completed the RIP process, a stall in the print engine will result.

Processing then proceeds to a step 1707, where the current time that the page stored in variable PAGE will begin rendering and printing is stored in variable RENDER_TIME. This is the time that, if the print engine were to be started at START_TIME and there were no stalls in the print engine, the page stored in variable PAGE would begin rendering and printing. This time is calculated by adding the time to render and print all pages before the page stored in variable PAGE to the time stored in variable START_TIME. Processing then proceeds to a deciding step 1708 where it is determined if the render time stored in the variable RENDER_TIME is less than the RIP time stored in the variable RIP_TIME. If the render time for the page is less than the RIP time for the page, the RIP process for the page will not be complete in time for the page to be rendered and printed, and a stall in the print engine may result.

If it is determined at the step 1708 that the render time stored in the variable RENDER_TIME is less than the RIP time stored in the variable RIP_TIME, processing proceeds to a step 1709, where the engine start time stored in the variable START_TIME is increased by the difference between the render time stored in the variable RENDER_TIME and the RIP time stored in the variable RIP_TIME. This increase in the engine start time ensures that the RIP process for the page stored in the variable PAGE will be completed by the time the page is required for rendering and printing. This increase in engine start time is needed to avoid a stall in the print engine. Processing then proceeds to a step 1710, where a render predicted task for the page stored in variable PAGE is created and is added to the list of render predicted tasks stored in the variable RENDER_TASKS. Processing then proceeds to a step 1704.

If it is determined at the step 1708 that the render time stored in the variable RENDER_TIME is not less than the RIP time stored in the variable RIP_TIME, processing proceeds to a step 1710, where a render predicted task for the page stored in the variable PAGE is created and is added to the list of render predicted tasks stored in the variable RENDER_TASKS. Processing then proceeds to a step 1704.

If it is determined at the step 1704 that there are no more pages in the list stored in the variable PAGES, processing terminates. At this stage, the variable START_TIME contains the print engine start time that ensures that stalls are avoided and total print time is minimised.

Figure 18:
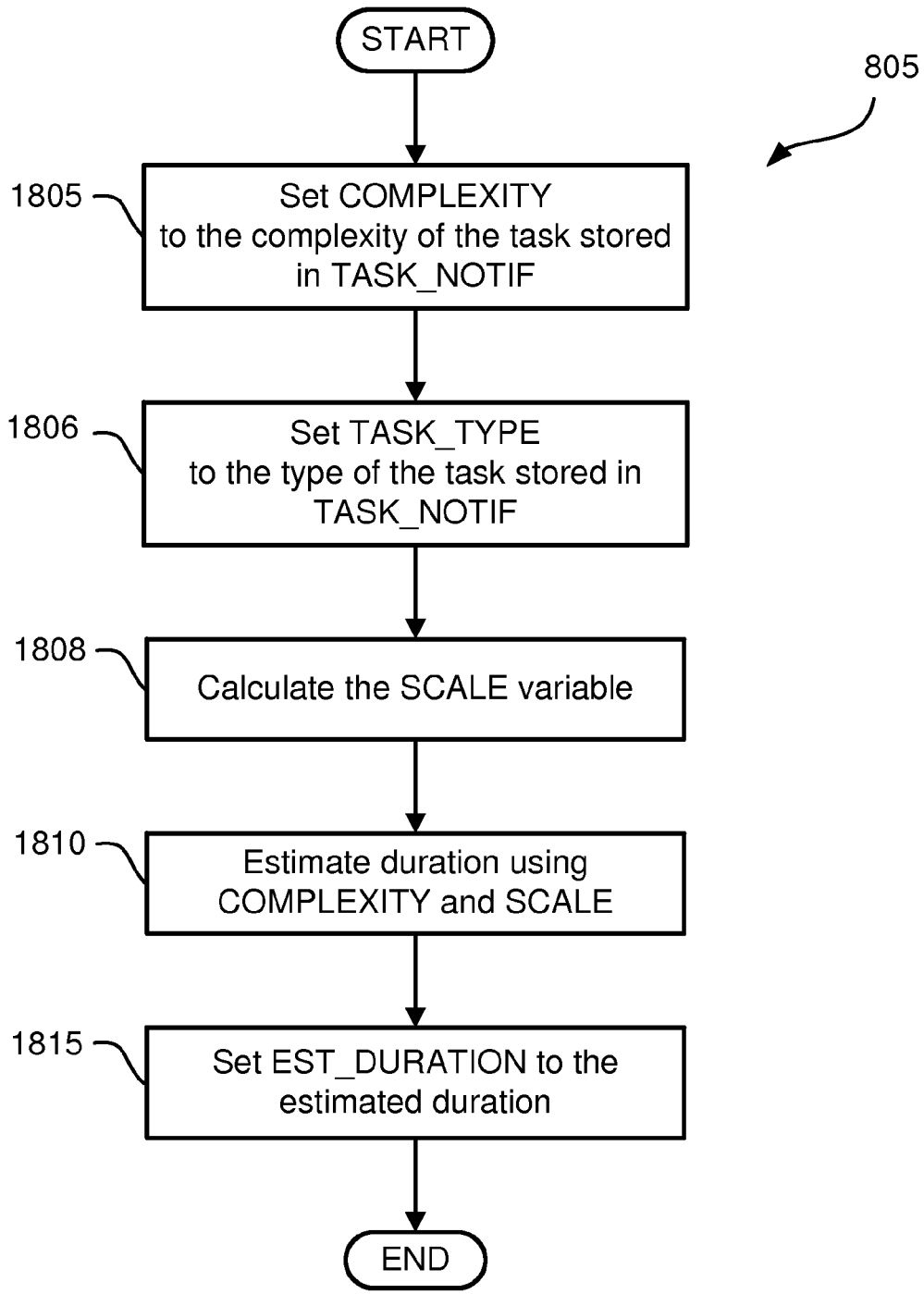
FIG. 18 shows a process for the estimation of a task duration.

FIG. 18 shows the process of estimating the duration of a task stored in the variable TASK_NOTIF by the Task Duration Estimator 602. The process 805 starts and proceeds to a step 1805 where the complexity of the task stored in the variable TASK_NOTIF is read in by the Task Duration Estimator 602. The Task Duration Estimator 602 stores the complexity of the task stored in the variable TASK_NOTIF in the variable COMPLEXITY. Processing then proceeds to a step 1806 where the type of the task stored in the variable TASK_NOTIF is read in by the Task Duration Estimator 602. The Task Duration Estimator 602 stores the type of the task stored in the variable TASK_NOTIF in the variable TASK_TYPE.

Processing then proceeds to a step 1808 where trend data associated with the TALLY variable from the process 709 is examined and a variable SCALE is calculated. If, for example, it is determined that the accumulated error in prediction has been biased towards a negative value, that is to say the estimator function on average has been under-predicting the duration of a task, then a suitable scale factor is calculated to remedy this circumstance. One method for calculating SCALE is to divide the TALLY by the sum of durations of all tasks that have contributed to TALLY. Other methods for calculating SCALE may be used. If there is no apparent bias in the estimations for task durations then SCALE is set to 1.

Processing then proceeds to a step 1810 where an estimator function that has been derived either through a machine learning experiment or any other way known in the art, estimates the time the given task would take to execute. This estimation is based on the complexity of the task stored in the variable COMPLEXITY and the type of the task stored in the variable TASK_TYPE. In addition, the scale value stored in variable SCALE is applied to the estimated duration by simply multiplying the estimated duration by the scale. Processing then proceeds to a step 1815 where the estimated time that the given task will take to execute, determined at the step 1810, in stored in the variable EST_DURATION by the Task Duration Estimator 602. Processing terminates upon completion of the step 1815.

FIGS. 19-23 depict an example of the current RPM arrangement.

FIG. 19 shows the processing time of each task for three pages 1904-1906 being processed on three threads 1901-1903. Tasks are assigned to threads by the Dispatcher 530, as described previously with reference to FIG. 5.

Each bar 1910-1919 corresponds to a task. The length of a bar indicates how long it takes to complete the task. Bars corresponding to the processing of tasks for different pages are given different patterns as denoted by Page 1 (ie 1904), Page 2 (ie 1905) and Page 3 (ie 1906).

Bars 1910-1919 are labelled according to the type of task that they correspond to. Bars 1910, 1914, and 1918 are "DL" tasks (display list task type). Bars 1911, 1912, 1915, 1916, and 1919 are "FG" tasks (fillmap generation task type). Two FG tasks are used to process page 1 (ie 1904), FG1 (ie 1911) and FG2 (ie 1912). Two FG tasks are used to process page 2 (ie 1905), FG1 (ie 1915) and FG2 (ie 1916). Task FG1 (ie 1919) is used to process Page 3 (ie 1906).

Bars 1913 and 1917 correspond to "FM" tasks (fillmap merge task type). Task FM 1913 is used to merge the fillmaps generated by the FG1 (ie 1911) and FG2 (ie 1912) for Page 1 (ie 1904). Task FM 1917 is used to merge the fillmaps generated by tasks FG1 (ie 1915) and FG2 (ie 1916) for Page 2 (ie 1905). As there is only one FG task (FG1 1919) for Page 3 (ie 1906), an FM task is not required for this page.

Thread 1 (ie 1901) is assigned the tasks FG2 (ie 1912), FM (ie 1913), and FG1 (ie 1919). Thread 2 (ie 1902) is assigned the tasks FG1 (ie 1911), FG2 (ie 1916), and FM (ie 1917). Thread 3 (ie 1903) is assigned the tasks DL (ie 1910), DL (ie 1914), DL (ie 1918), and FG1 (ie 1915).

In addition to the threads 1901-1903, FIG. 19 shows the Printer Engine 195 that renders and prints the final fillmaps for pages 1904-1906 as generated by the multi-threaded RIP.

Bars 1920, 1921, and 1922 correspond to the printing of Page 1 (ie 1904), Page 2 (ie 1905), and Page 3 (ie 1906), respectively. The printing of a page by the Printer Engine 195 is known as a print task. The duration of these print tasks is represented by the lengths of bars 1920-1922, which are equal, since in the described example of the RPM arrangement the rendering and printing of a page takes a fixed duration of time.

Print Task 1920, which corresponds to the printing of page task for Page 1 (ie 1904), starts at the time that the last Task for that page, task FM (ie 1913), finishes. Print task 1921, which corresponds to the printing of page 2 (ie 1905), starts at the time that the last task for page 2 (ie 1905), task FM (ie 1917), finishes. The last task for page 3 (ie 1906) is FG (ie 1919) and it finishes earlier than the last task for page 2 (ie 1905), task FM (ie 1917). Because pages must be printed in page order, the Print Task 1922 (which prints page 3), must be delayed until the printing of page 2, Print Task 1921, is complete. Because the final fillmap for page 3 is available to the Printer Engine 195 before the printing of page 2 is complete, Print Task 1922 for page 3 can begin immediately after printing of page 2 is complete.

In the example shown in FIG. 19, there is a large delay 1930 between the completion of printing of Page 1 (ie 1904), Print Task 1920, and the start of printing of Page 2 (ie 1905), Print Task 1921. This delay is caused by the last task for Page 2 (ie 1905), FM 1917, not being complete before the end of the printing of page 1. A stall in the Printer Engine 195 therefore results.

As described earlier, a stall in a printer engine can cause additional delays in printing, and additional wear on printer components. The current RPM arrangement describes methods for predicting the times of future events in a multi-threaded RIP, and determining when a re-prediction of the times of future events can be avoided. In the described example, these techniques are applied to the problem of determining the best time to start a printer engine to print a rendering job, while minimising total print time. With reference to FIG. 19, if the Print Task 1920 is delayed, the stall 1930 in Printer Engine 195 can be avoided.

An example of the time at which prediction accuracy is required will now be described with reference to FIG. 20. As stated earlier, in the described example the future event is the best time to start a printer engine. Therefore, the time at which prediction accuracy is required corresponds to the minimum time that a printer engine can possibly be started while ensuring that stalls are avoided. An example of this time is shown as a dashed line 2045 with reference to FIG. 20.

The schedule of all tasks 1910-1919 for pages 1904-1906, onto threads 1901-1903 is as described previously with reference to FIG. 19. However, in this example, a period of time has elapsed and the current time is shown as a vertical line 2030 with reference to FIG. 20. At this time, the tasks represented by bars 1910, 1914, and 1918 have completed execution (ie these page building jobs are finished), the tasks represented by bars 1911, 1912, and 1915 are currently being executed, and the tasks represented by bars 1913, 1916, 1917, and 1919 have not yet begun execution. The durations of tasks that have not yet completed execution is as determined by the Predictor 525. The schedule of tasks (i.e. the allocation of tasks to threads) is also as determined by the Predictor 525, and may not match the actual execution of the tasks within the multi-threaded RIP.

Figure 20:
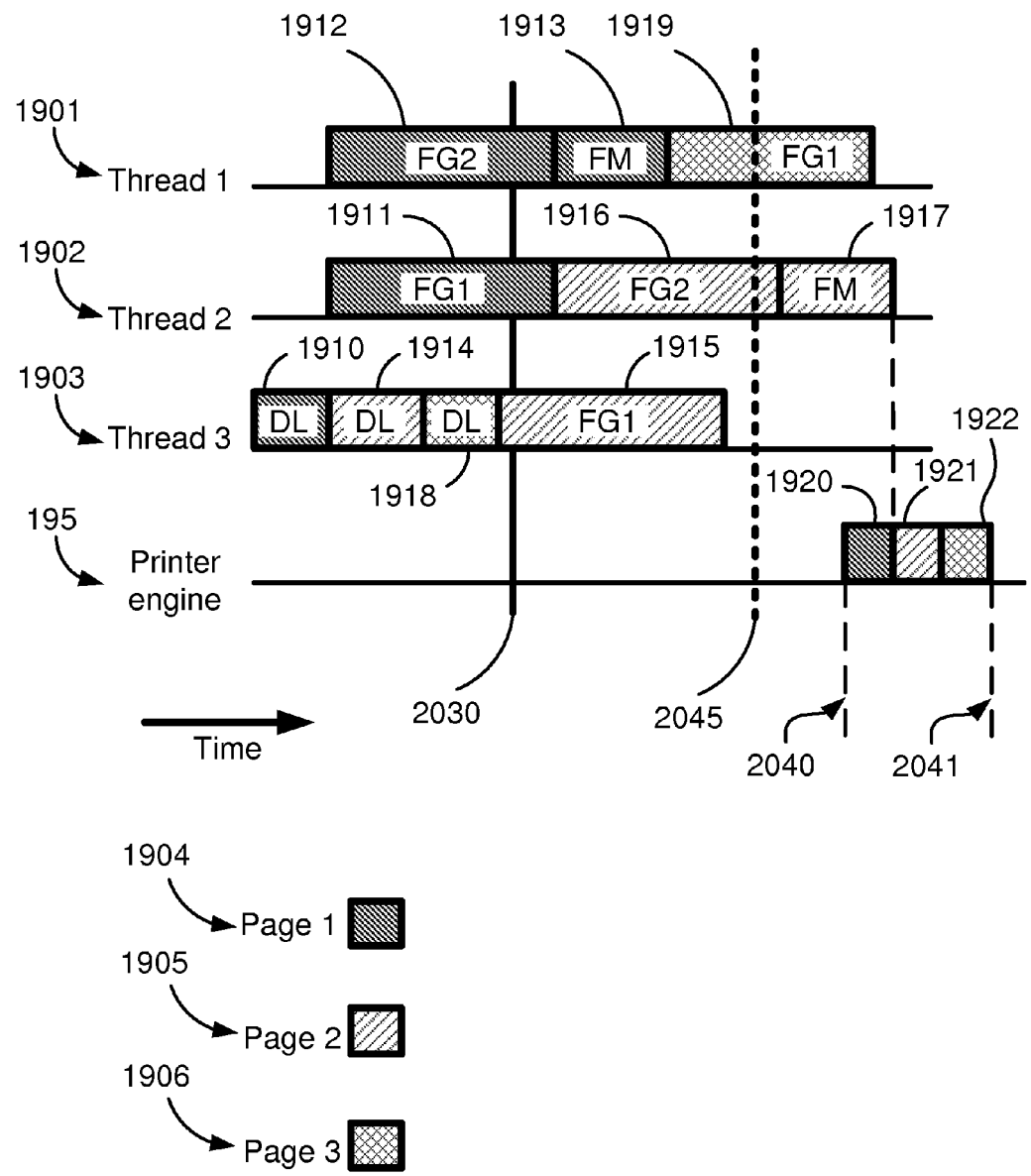
FIG. 20 shows an example of the time at which prediction accuracy is required.

Using techniques described by the current RPM arrangement, the predicted engine start time has been determined, and is represented by a dashed line 2040 with reference to FIG. 20. Assuming that the engine start time is not changed as a result of further predictions, print tasks represented by bars 1920-1922 will be executed in sequence starting from the engine start time 2040. The total print time is shown by the dashed line 2041.

Using the process described previously with reference to FIG. 13, the minimum time that the print engine can possibly be start has been determined to be the time represented by the dashed line 2045. Therefore, re-prediction of the engine start time will be avoided while the current time (represented by line 2030) is less than the minimum engine start time (represented by dashed line 2045).

A process for determining if re-prediction is required in response to a task finishing earlier than estimated was described previously with reference to the process 709 in FIG. 9. An example of the reduction in total print time that can be achieved by performing a re-prediction in response to a task finishing earlier than estimated will now be described with reference to FIG. 21A.

Figure 21A:
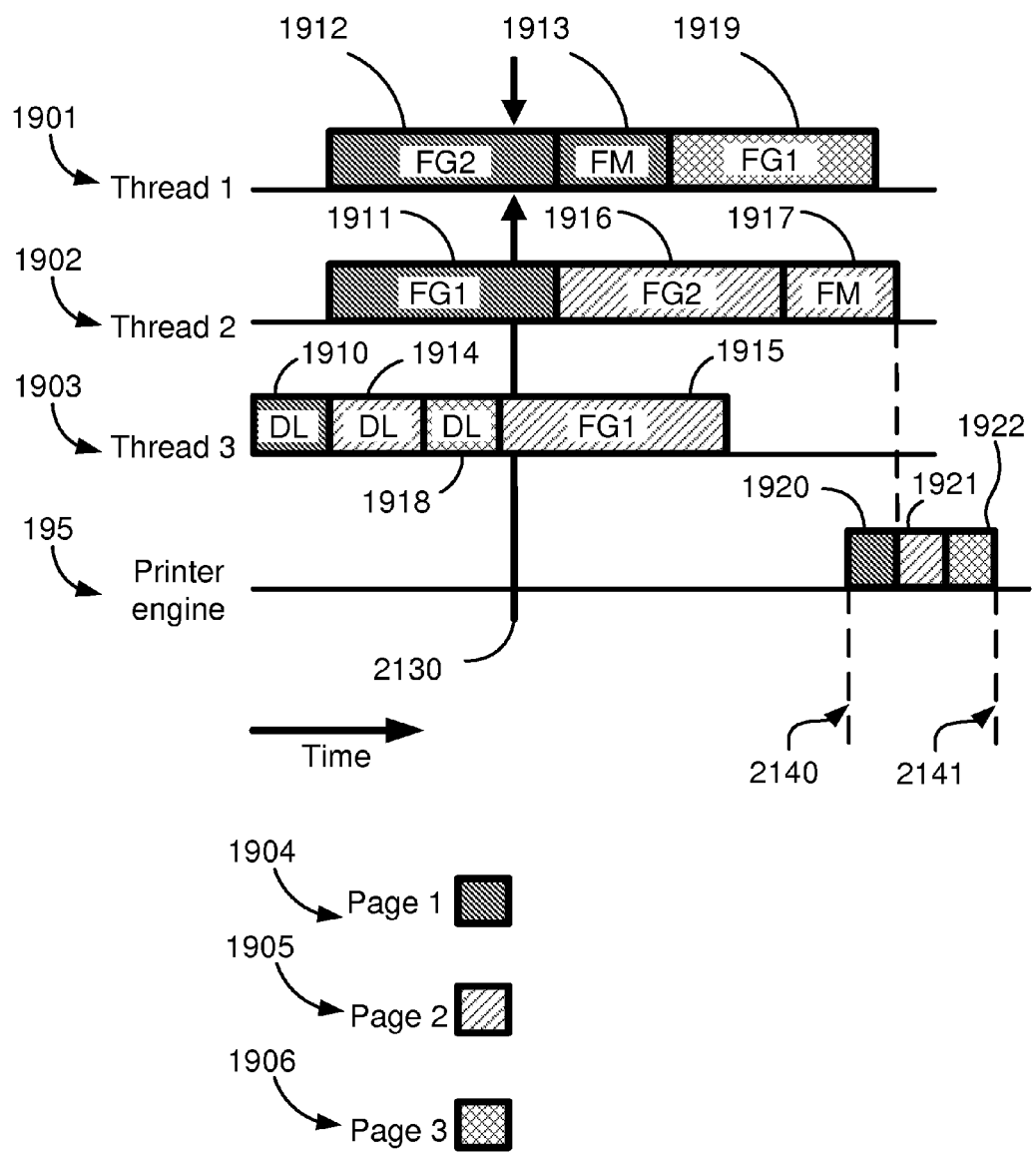
FIGS. 21A and 21B collectively show an example of a task finishing execution earlier than estimated and the possible reduction in total print time.

As described with reference to FIG. 19, the multi-threaded RIP has three threads 1901-1903, and there are three pages to be printed 1904-1906. Tasks 1910-1919 have been previously scheduled for execution on threads 1901-1903 during a previous prediction of the engine start time. The engine start time based on this schedule that results in a minimal total print time while avoiding stalls is shown in FIG. 21A as 2040. Print Tasks 1920-1922 are started at a time 2140, and the total print time is given by 2141 in FIG. 21A.

In this example, an FG2 (ie 1912) of page 1 (ie 1904) has finished earlier than estimated, at time shown by a line 2130. In response to FG2 (ie 1912) finishing earlier than estimated, Predictor 525 must determine if a re-prediction is required and, if a re-prediction is required, it must perform the re-prediction of the engine start time event. This process was described previously with reference to FIG. 7.

Figure 21B:
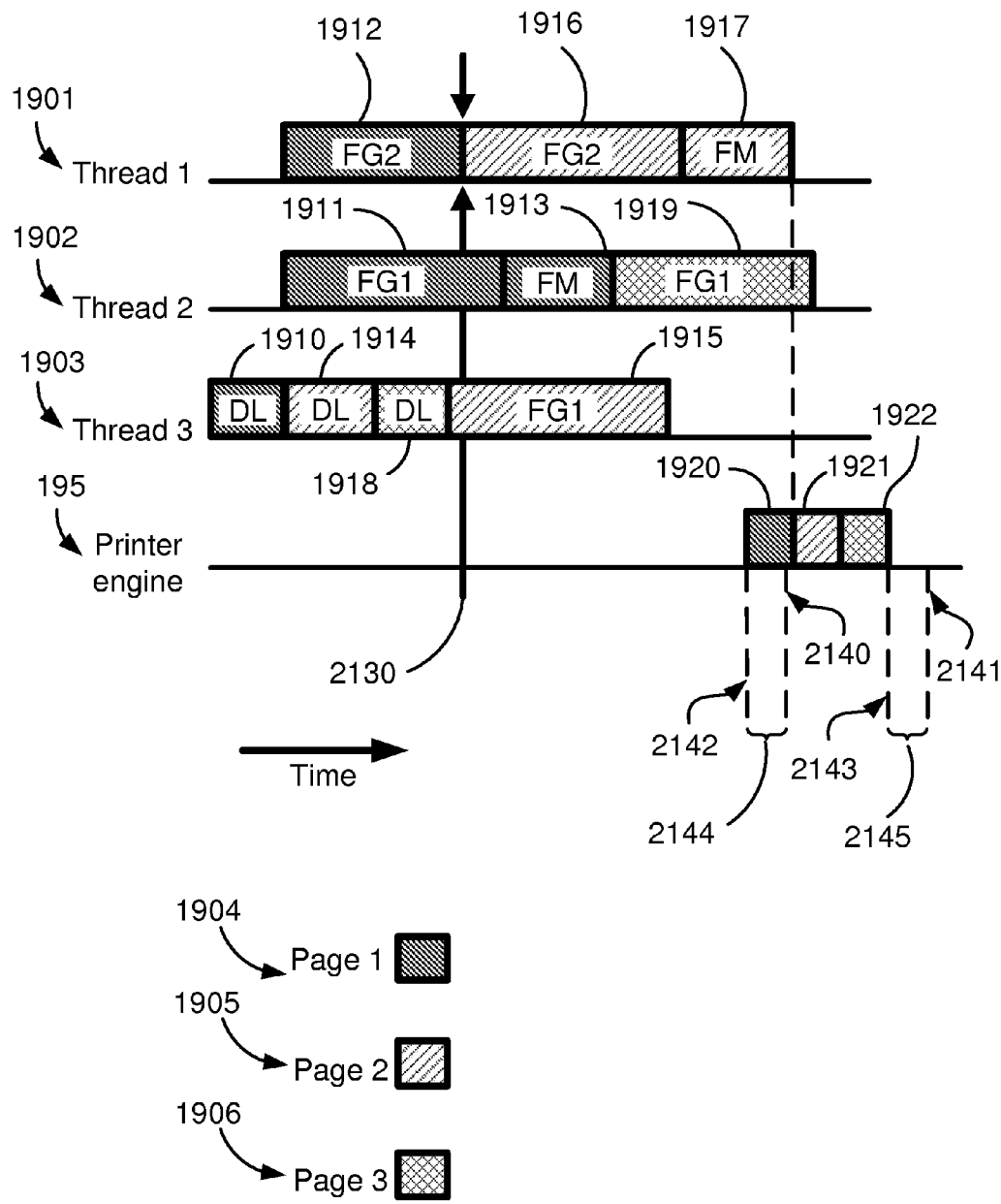

FIG. 21B shows the effect of performing a re-prediction of the engine start time in response to the FG2 (ie 1912) finishing earlier than estimated. If a re-prediction is performed, the threads to which tasks 1913, 1916, 1917 and 1919 are allocated by the Event Time Predictor 605 will change. Task 1913 will not be able to be executed on thread 1901 at its original time, since FG1 (ie 1911) and FG2 (ie 1912) must finish execution before the task merging them, FM (ie 1913), can start (see the previous description of task dependencies with reference to FIG. 5). As a result, FG2 (ie 1916) for page 2 (ie 1905) can begin execution earlier. The threads to which other remaining tasks are assigned may also change. In general, it is very difficult to determine whether tasks will be allocated to different threads as a result of a re-prediction.

In this example, task FG2 (ie 1912) finishing earlier than estimated has meant that the RIP processing for page 2 (ie 1905) is brought forward in time. If the RIP times of one or more pages is brought forward in time, it may be possible to also reduce the engine start time. In this example the engine start time can be reduced from the time 2140 to the time 2142, while still ensuring that there are no stalls. The magnitude of the change in engine start time is shown as 2144 in FIG. 21B. This has resulted in a reduction in the total print time 2145 in FIG. 21B. The total print time has changed from the time shown as 2141 to the time 2143.

In this example, a re-prediction of the engine start time has resulted in a reduction in total print time. However, when there are many tasks remaining to be processed, performing a re-prediction after each task finishes execution may be time-consuming. Therefore, the RPM arrangement performs re-prediction of the times of future events only when it is required or when there is the possibility of a significant gain. A threshold (or more generally a "criterion") is used to detect this, as described previously with reference to process 901 in FIG. 11. In the example shown in FIG. 21B, this re-prediction may or may not be performed, depending on the value of the threshold set and the value of the tally which depends on the error in estimated duration of previously-executed tasks (ie previously finished page building jobs) in the multi-threaded RIP.

A process for determining if re-prediction is required in response to a task finishing later than estimated was described previously with reference to FIG. 9. An example of avoiding a stall in a print engine using re-prediction in response to a task finishing later than estimated will now be described with reference to FIG. 22A.

Figure 22A:
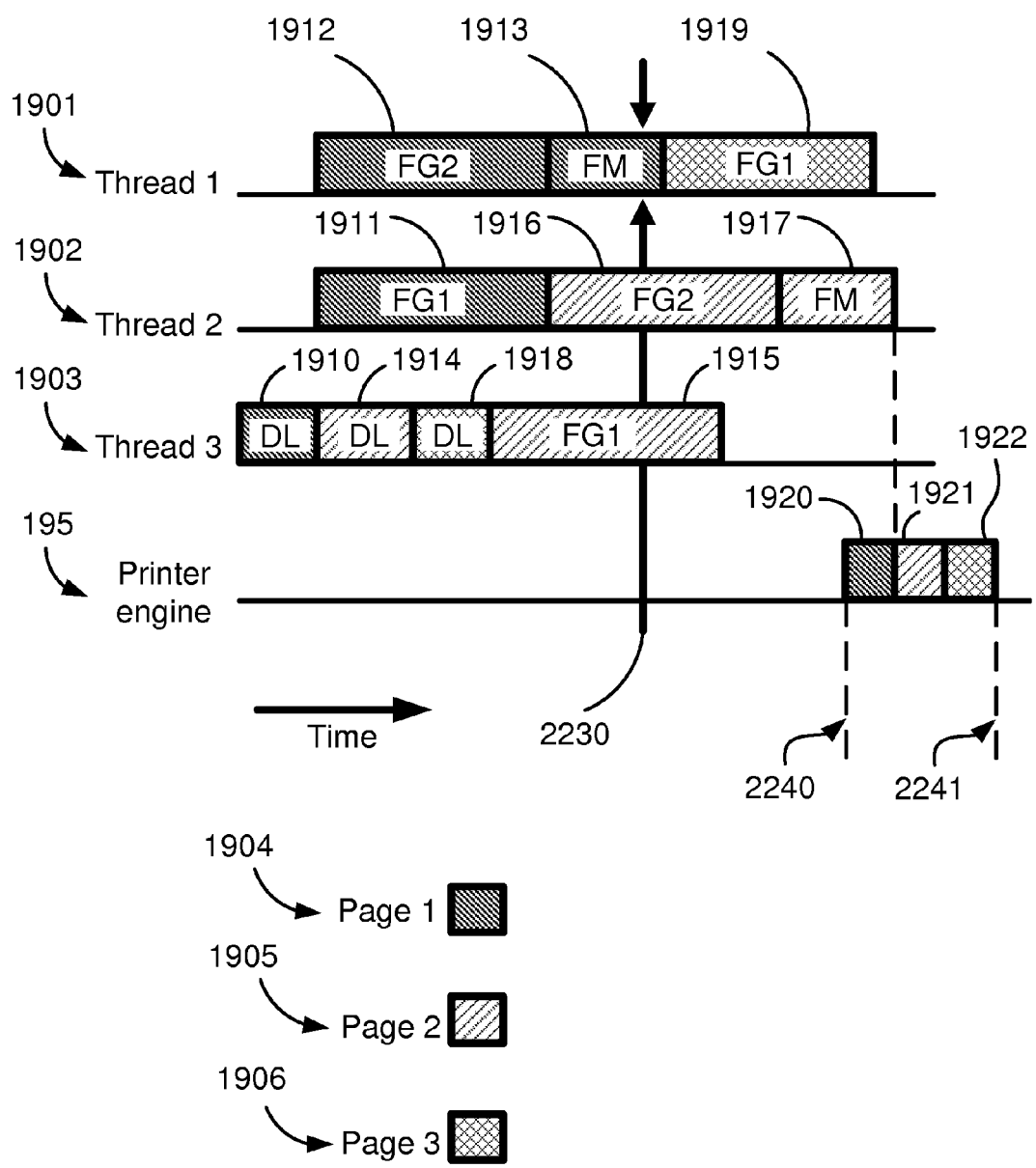
FIGS. 22A and 22B collectively show an example of a task finishing execution later than estimated and the avoidance of a print engine stalls.

As described with reference to FIG. 19, the multi-threaded RIP has three threads 1901-1903, and there are three pages to be printed 1904-1906. Tasks 1910-1919 have previously been scheduled for execution on threads 1901-1903 during a previous prediction of the engine start time. The engine start time based on this schedule, that results in a minimal total print time while avoiding stalls is shown in FIG. 22A as 2240. If the printing of pages 1904-1906 (Print Tasks 1920-1922) by Printer Engine 195 is started at time 2240, the total print time is 2241.

In this example, task FG1 (ie 1912) of Page 1 (ie 1904) has finished later than estimated, at time shown by 2230. In response to FG1 (ie 1912) finishing later than estimated, Predictor 252 must determine if a re-prediction is required and, if a re-prediction is required, it must perform the re-prediction of the engine start time event. This process was described previously with reference to FIG. 7.

Figure 22B:
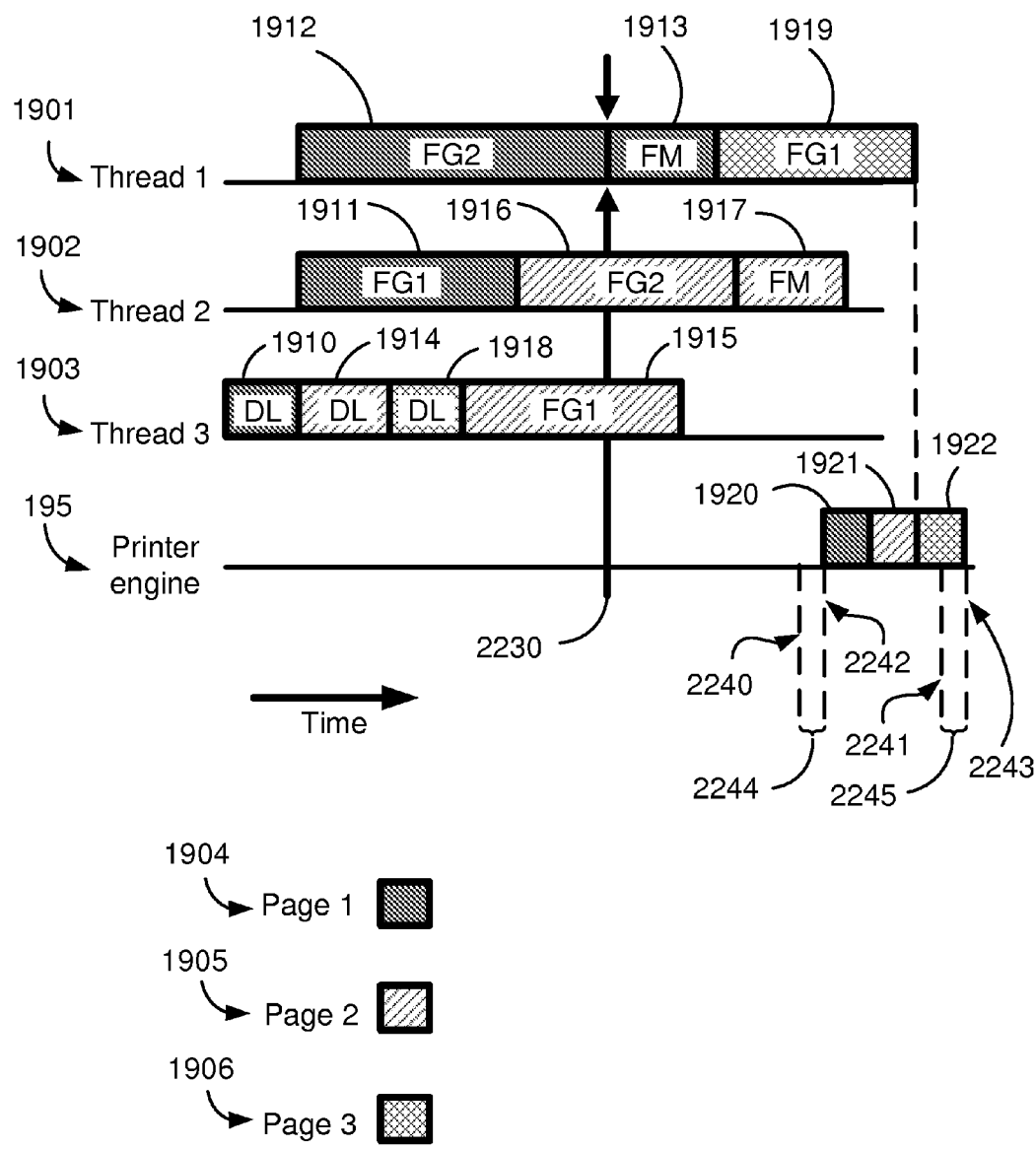

FIG. 22B shows the effect of performing a re-prediction of the engine start time in response to task FG2 (ie 1912) finishing later than estimated. If a re-prediction is performed, the execution of tasks FM (ie 1913) and FG1 (ie 1919) will be delayed. In this example, the allocation of tasks to processors has not changed. In other examples, this allocation may change. In general, it is very difficult to determine whether tasks will be allocated to different threads as a result of a re-prediction.

In this example, task FG2 (ie 1912) finishing later than estimated means that the RIP time for Page 1 (ie 1904) is delayed. It also means that the RIP time for Page 3 (ie 1906) has been delayed in this time. If the RIP times of one or more pages is delayed, stalls in the print engine may result. In this example if the print engine 1907 is started at the original engine start time 2240, the RIP process for Page 3 (ie 1906), which corresponds with the finish time of task 1919, will be less than the time that the page is required by the print engine. An engine stall will therefore result. A re-prediction therefore needs to occur in this situation, so that the engine start time can be increased to avoid stalls. With reference to FIG. 22B, the engine start time is increased from the time 2240 to the time 2242. The magnitude of the change in engine start time is 2244, which leads to an increase in the total print time 2245. The total print time has changed from time 2241 to time 2243. While the total print time has increased, it is the lowest possible value while avoiding engine stalls.

In this example, a re-prediction of the engine start time has resulted in engine stalls being avoided. However, when there are many tasks remaining to be processed, performing a re-prediction after each task finishes execution may be time-consuming. Therefore, the RPM arrangement performs re-prediction of the times of future events only when it is required or there is the possibility of engine stalls. A threshold (or more generally a "criterion") is used to detect this, as described previously with reference to process 901 on FIG. 11. In the example shown in FIG. 21B, this re-prediction may or may not be performed, depending on the value of the threshold set and the value of the tally which depends on the error in estimated duration of previously-executed tasks in the multi-threaded RIP.

FIG. 23 will now be used to describe an example of predicting the time that the RIP process for a page will be complete. As described with reference to FIG. 19, the multi-threaded RIP has three threads 1901-1903 and there are three pages to be printed 1904-1906. Tasks 1910-1919 have previously been scheduled for execution on threads 1901-1903.

As described with reference to FIG. 14, a schedule of tasks remaining to be executed is produced. This process involves determining which tasks to allocate to which threads, and the times that those tasks should begin execution by the appropriate threads. In this example, this step results in the schedule shown in FIG. 23, where tasks FG2 (ie 1912), FM (ie 1913), and FG1 1919 are allocated to Thread 1 (ie 1901), the tasks FG1 (ie 1911), FG2 (ie 1916), and FM (ie 1917) are allocated to Thread 2 (ie 1902), and tasks DL (ie 1910), DL (ie 1914), DL 1918 and FG1 (ie 1915) are allocated to Thread 3 (ie 1903).

The last task for the page whose RIP finished time is being predicted is then found in the schedule of future tasks. In the example shown in FIG. 23, the last task for Page 1 (ie 1904) is FM (ie 1913), the last task for page 2 (ie 1905) is FM (ie 1917), and the last task for Page 3 (ie 1906) is task FG1 (ie 1919).

Finally, the time that the last task for the page is finished is determined. This is the time that the page will be ready to be printed, also known as the RIP time. In the example shown in FIG. 23, the RIP time of page 1 (ie 1904) is time 2320, the RIP time of Page 2 (ie 1905) is time 2321, and the RIP time of page 3 (ie 1906) is time 2322. The RIP time for a page is calculated by summing the durations of all tasks preceding the last task for the page on the relevant thread, adding the duration of the last task for the page, adding any time that the thread is not processing any task, and finally adding the time at which the page times are being predicted 2330. For example, the RIP time 2321 for page 2 (ie 1905) is calculated by summing the durations of tasks FG1 (ie 1911), FG2 (ie 1916), and FM (ie 1917), with the time that Thread 2 (ie 1902) is stalled 2331, with the time at which the page RIP times are being predicted 2330.

Figure 25:
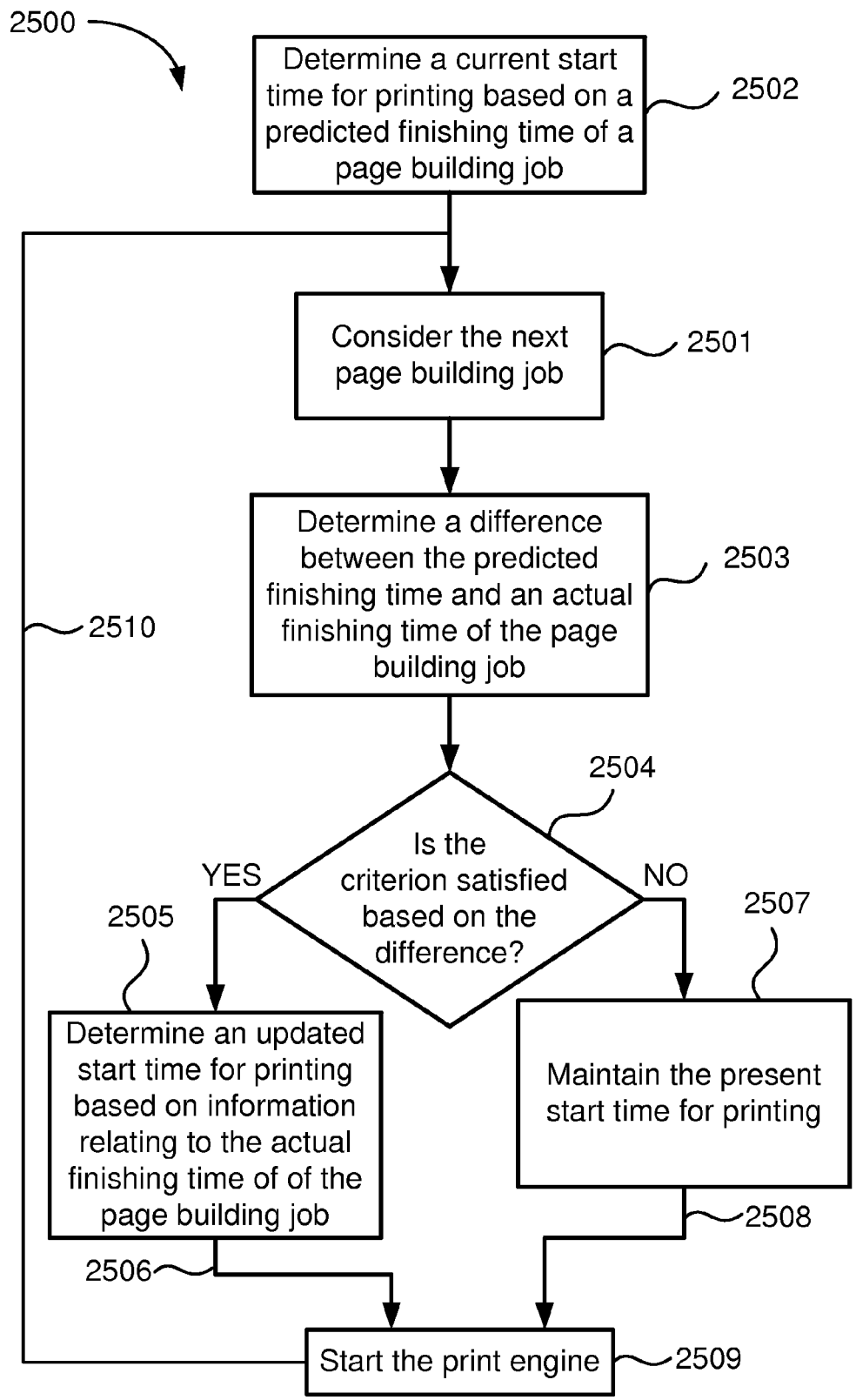
FIG. 25 shows a process flow chart for an example of the RPM method.

FIG. 25 shows a process flow chart in which one example of the RPM method determines, for a rendering job comprising one or more page building jobs, a start time for a print engine to print the rendering job. In a step 2502 the controller processor 170 determines, for the rendering job, a current start time for printing based on at least a predicted finishing time (ie time to finish execution) of a page building job. In a following step 2501 the controller processor 170 considers the next page building job to finish execution. Thereafter in a step 2503 the processor 170 determines a difference between the predicted finishing time and an actual finishing time of the page building job. In a following test step 2504 the processor 170 determines if a predetermined condition is satisfied based on the difference. If this is the case and the predetermined criterion is satisfied then the process 2500 follows a YES arrow from the step 2504 to a step 2505 in which the controller processor 170 determines an updated start time for printing the rendering job based on information about a finished page building job. The process 2500 then follows an arrow 2506 to a step 2509 which starts the print engine according to the updated start time. The process 2500 then follows an arrow 2510 back to the step 2501. If the step 2504 determines that the difference does not satisfy the criterion, then the process 1500 follows a NO arrow from the step 2504 to a step 2507 which is a null step which maintains the current start time for printing. The process 2500 then follows an arrow 2508 to the step 2509 which starts the print engine according to the present start time. The process 2500 then follows the arrow 2510 back to the step 2501.

INDUSTRIAL APPLICABILITY

The arrangements described are applicable to the computer and data processing industries and particularly for the efficient printing of page object information. The foregoing describes only some examples of the present invention, and modifications and/or changes can be made thereto without departing from the scope and spirit of the invention, the examples being illustrative and not restrictive.

Thus for example, although the RPM arrangements have been described in the context of printing systems, the RPM arrangements can also be applied to the general prediction of the times of future events, particularly but not necessarily, in a multi-threaded processing system.

Furthermore, although a multi-core processor implementation has been described for practicing the RPM arrangements, other processing architectures such as processor clusters and processor grids may also be used.

What is claimed is:

1. A method of determining, for a rendering job comprising one or more page building jobs, a start time for a print engine to print the rendering job, the method comprising:
   determining for the rendering job a current start time for printing based on at least a predicted finishing time of a page building job, wherein the page building job contains at least one object from a group that includes text, a line, a fill region, and image data;
   determining a difference between the predicted finishing time and an actual finishing time of the page building job;
   determining if the difference falls outside a range established by a predefined maximum value and a predefined minimum value;
   determining an updated start time for printing the rendering job based on information relating to the actual finishing time of the page building job if the difference falls outside the range; and
   starting the print engine to print the rendering job at the updated start time.

2. A method according to claim 1, wherein the one or more page building jobs are executed as program threads each running on a corresponding one of a plurality of processor cores.

3. A method according to claim 1, wherein the rendering job is associated with a printable page containing a plurality of page objects, and wherein the page objects are allocated to page building jobs dependent upon a z order appearance of the page objects on the printable page.

4. A method according to claim 1, wherein the printable page contains a bitmap image, and wherein the bitmap image is allocated to a page building job.

5. A method according to claim 1, wherein the predicted finishing time of the page building job is determined based upon a complexity of the page building job.

6. A method according to claim 1, wherein the predicted finishing time of the page building job is refined using knowledge of previous page building jobs that have finished execution.

7. A method according to claim 1, further comprising repeating, for a corresponding plurality of completed page building jobs, determining the difference between the predicted finishing time and the actual finishing time, wherein determining an updated start time is dependent upon if an accumulation of the determined differences falls outside the range.

8. A method according to claim 1, wherein determining the updated start time comprises:
   determining a minimum time for completion of all the page building jobs, and
   determining the updated start time for printing the rendering job only if a current time is greater than the determined minimum time.

9. A method according to claim 1, wherein, in order to capture smaller changes in the current start time, a distance between the predefined maximum and minimum values reduce in value as a current time approaches the current start time.

10. A method of determining a start time of an event dependent upon completion of one or more tasks, the method comprising:
    determining a current start time of the event, wherein the current start time is based on at least a predicted finishing time of a task, wherein the task contains at least one object from a group that includes text, a line, a fill region, and image data;
    determining, for the task, a difference between the predicted finishing time and an actual finishing time;
    determining if the difference falls outside a range established by a predefined maximum value and a predefined minimum value;
    determining an updated start time of the event based on information relating to the actual finishing time of the task if the difference falls outside the range; and
    starting the event at the updated start time.

11. An apparatus for determining, for a rendering job comprising one or more page building jobs, a start time for a print engine to print the rendering job, the apparatus comprising:
    a processor; and
    a computer readable storage device containing a program for directing the processor to execute a method, the method comprising:
    determining for the rendering job a current start time for printing based on at least a predicted finishing time of a page building job, wherein the page building job contains at least one object from a group that includes text, a line, a fill region, and image data;

determining a difference between the predicted finishing time and an actual finishing time of the page building job;

determining if the difference falls outside a range established by a predefined maximum value and a predefined minimum value;

determining an updated start time for printing the rendering job based on information relating to the actual finishing time of the page building job if the difference falls outside the range; and starting the print engine to print the rendering job at the updated start time.

12. An apparatus according to claim 11, wherein the processor is a multi-core processor, the program is multi-threaded, and the one or more page building jobs are executed as program threads each running on a corresponding one of a plurality of processor cores.

13. A non-transitory computer readable data storage medium containing a program for directing a processor to execute a method of determining, for a rendering job comprising one or more page building jobs, a start time for a print engine to print the rendering job, the method comprising:

determining for the rendering job a current start time for printing based on at least a predicted finishing time of a page building job, wherein the page building job contains at least one object from a group that includes text, a line, a fill region, and image data;

determining a difference between the predicted finishing time and an actual finishing time of the page building job;

determining if the difference falls outside a range established by a predefined maximum value and a predefined minimum value;

determining an updated start time for printing the rendering job based on information relating to the actual finishing time of the page building job if the difference falls outside the range; and starting the print engine to print the rendering job at the updated start time.

14. A non-transitory computer readable data storage medium according to claim 13, wherein the processor is a multi-core processor, the program is multi-threaded, and the one or more page building jobs are executed as program threads each running on a corresponding one of a plurality of processor cores.

* * * * *